(12) United States Patent
Suter et al.

(10) Patent No.: US 6,938,403 B2
(45) Date of Patent: Sep. 6, 2005

(54) FRUIT HARVESTER INCLUDING TELESCOPING BOOM AND RELATED METHODS

(75) Inventors: Michael L. Suter, Lakeland, FL (US); Eitan Zehavi, Kiriat Tivon (IL); David Chiel, Afula Ilit (IL)

(73) Assignee: FMC Technologies, Inc., Chicago, IL (US)

( * ) Notice: Subject to any disclaimer, the term of this patent is extended or adjusted under 35 U.S.C. 154(b) by 98 days.

(21) Appl. No.: 10/384,189

(22) Filed: Mar. 7, 2003

(65) Prior Publication Data

US 2004/0221565 A1 Nov. 11, 2004

(Under 37 CFR 1.47)

Related U.S. Application Data

(63) Continuation-in-part of application No. 10/317,833, filed on Dec. 12, 2002, and a continuation-in-part of application No. 10/317,834, filed on Dec. 12, 2002.

(51) Int. Cl.$^7$ .............................................. A01D 46/00
(52) U.S. Cl. ..................................... 56/340.1; 56/328.1
(58) Field of Search ............................... 56/328.1, 332, 56/340.1, 10.2 E, 327.1; 180/235

(56) References Cited

U.S. PATENT DOCUMENTS

| | | |
|---|---|---|
| 1,459,731 A | 6/1923 | Henderson |
| 2,562,539 A | 7/1951 | Ellis et al. |
| 3,579,970 A | 5/1971 | Gilbert et al. ................ 56/328 |
| 3,623,308 A | 11/1971 | Nye |
| 3,771,301 A | 11/1973 | Favor .......................... 56/328 |

(Continued)

FOREIGN PATENT DOCUMENTS

| | | |
|---|---|---|
| WO | 01/35721 | 5/2001 |
| WO | 02/069693 | 9/2002 |
| WO | 02/089556 | 11/2002 |

OTHER PUBLICATIONS

Galen K. Brown: "Citrus Harvesting Program Update for the 1999–2000 season", Florida Department of Citrus, published by Postharvest Florida Citrus Information Guide, pp. 1–16.

Orchard Rite Ltd., "Nutshakers Agricultural Tree Shakers", Pacific Distributing, Inc., California, 1998.

Photograph labeled 1 is a photo of a Lilliston conveyor, no date.

Photgraph labeled 2 is a photo of an Israeli agricultural machine, no date.

ASV, Inc., Grand Rapids, MN: "4810 Posi–Track All Purpose Crawler", pp. 2–7, no date.

Primary Examiner—Árpád Fábián Kovács
(74) Attorney, Agent, or Firm—Allen, Dyer, Doppelt, Milbrath & Gilchrist, P.A.

(57) ABSTRACT

A fruit harvester may include a vehicle, a telescoping boom, a shaker head connected to the distal end of the telescoping boom for vibrating a tree to shake fruit from the tree. A boom positioning assembly is provided for connecting the boom to the vehicle. The boom positioning assembly may include a vertical guide mounted to the vehicle, a hinge joint assembly movable vertically along the vertical guide and connected to the proximal end of the telescoping boom to permit pivotal movement of the telescoping boom in both elevational and azimuthal directions. The boom positioning assembly may also include a vertical actuator for moving the hinge joint assembly vertically along the at least one vertical guide, and an elevational actuator for pivotally moving the telescoping boom in the elevational direction. The vertical guide may be pivotally mounted to the vehicle, and a tilt actuator may be provided for tilting the vertical guide relative to the vehicle.

42 Claims, 15 Drawing Sheets

U.S. PATENT DOCUMENTS

| | | | | |
|---|---|---|---|---|
| 3,780,510 A | * | 12/1973 | Tompkins | 56/340.1 |
| 3,785,131 A | | 1/1974 | Friday et al. | 56/328 |
| 3,808,786 A | | 5/1974 | Beckens | 56/329 |
| 3,901,005 A | | 8/1975 | Rohrbach et al. | 56/330 |
| 3,961,718 A | | 6/1976 | Lucas | 214/520 |
| 3,964,244 A | | 6/1976 | Vallicella | 56/329 |
| 3,992,861 A | * | 11/1976 | Edwards | 56/328.1 |
| 4,194,347 A | | 3/1980 | Peters | 56/328 |
| 4,223,515 A | | 9/1980 | Borchard | 56/328 |
| 4,275,548 A | | 6/1981 | Savage, Sr. | 56/328 |
| 4,275,549 A | * | 6/1981 | Deal, Jr. | 56/328.1 |
| 4,414,795 A | | 11/1983 | Johnstone et al. | 56/328 |
| 4,718,223 A | * | 1/1988 | Suzuki et al. | 56/328.1 |
| 4,768,332 A | | 9/1988 | Bizzini | 56/340.1 |
| 4,986,065 A | | 1/1991 | Compton | 56/340.1 |
| 5,228,279 A | | 7/1993 | McKenna, Jr. et al. | 56/328.1 |
| 5,247,787 A | * | 9/1993 | Snell | 56/340.1 |
| 5,406,780 A | | 4/1995 | Laserson et al. | 56/340.1 |
| 5,413,453 A | | 5/1995 | Hill | 414/729 |
| 5,469,695 A | | 11/1995 | Zehavi et al. | 56/301.1 |
| 5,473,875 A | | 12/1995 | Zehavi et al. | 56/301.1 |
| 5,513,484 A | | 5/1996 | Zehavi et al. | 56/16.6 |
| 5,563,097 A | | 10/1996 | Lee | 56/327.1 |
| 5,586,426 A | * | 12/1996 | Warkentine | 56/327.1 |
| 5,784,871 A | | 7/1998 | Glancey et al. | 56/327.1 |
| 5,816,037 A | | 10/1998 | Chiel et al. | 56/301.1 |
| 5,860,273 A | | 1/1999 | Laserson et al. | 56/301.1 |
| 6,282,878 B1 | | 9/2001 | Hill | 56/329 |

* cited by examiner

FRUIT HARVESTER INCLUDING TELESCOPING BOOM AND RELATED METHODS

RELATED APPLICATIONS

The present application is a continuation-in-part of U.S. patent application Ser. No. 10/317,833 filed Dec. 12, 2002, and a continuation-in-part of 10/317,834 filed Dec. 12, 2002, the entire disclosures of each of which are incorporated herein in their entirety by reference.

FIELD OF THE INVENTION

The invention relates to fruit harvesting equipment, and, more particularly, to a fruit harvester for shaking fruit from a tree and associated methods.

BACKGROUND OF THE INVENTION

Citrus fruit, such as oranges, for example, is commonly harvested from citrus groves using manual picking and collection techniques. Of course, more automated approaches have also been developed in an attempt to lower harvesting costs. For example, U.S. Pat. Nos. 5,469,695 and 5,513,484; and published international patent applications WO02/089556 and WO02/069693, to Zehavi et al., disclose a harvesting system based upon so-called shake and catch technology. A shaker vehicle carries a shaker head to engage and vibrate a tree trunk to dislodge the fruit therefrom. The shaker head is carried by an extensible boom which can retract and extend the shaker head. In the extended position, the jaws of the shaker head engage the tree trunk and a hydraulically driven vibrator shakes the tree trunk. The shaker head can be retracted by the extensible boom for advancing to the next tree.

A fruit deflector is carried by the shaker vehicle and collects a portion of the fruit. A fruit collector vehicle is positioned along an opposite side of the tree. The fruit collector typically includes one or more fruit conveyors to catch the portion of the fruit falling thereon, as well as to receive fruit from the fruit deflector of the shaker vehicle.

The collected fruit is conveyed by the fruit collector vehicle to be temporarily held in a fruit trailer typically towed behind the fruit collector vehicle. The shaker vehicle and fruit collector vehicle are each advanced to a next tree for harvesting. Once filled, the fruit trailer is movable to a raised height and a door opened to thereby empty its contents into a fruit removal vehicle. The fruit removal vehicle is intermittently brought adjacent the fruit trailer to receive the fruit therefrom and transport the fruit to a collection area.

Of significant interest in the automated harvesting technology are efficiency of fruit collection, speed of collection, and, of course, cost and reliability of the various pieces of harvesting and collection equipment. Efficiency of fruit collection relates not only to the percentage of fruit shaken from the tree and collected, but also to how much fruit may be lost by damage in subsequent handling. The speed of collection may be hampered if the fruit is not quickly and safely urged toward the lower end of the fruit deflector where it then falls onto the fruit collector.

A typical fruit deflector, such as that disclosed in the above mentioned patents to Zehavi et al., is a static structure that relies on its incline and the pull of gravity to urge the fruit toward its lower end. It should also be noted that leaves, twigs, etc. are also shaken from the tree and these may present an impediment to the downward roll of the fruit from the fruit collector to the fruit collector. Accordingly, these drawbacks of the fruit deflector may result in lower fruit collection efficiency, and/or increased collection time thereby increasing harvesting costs.

It also typically important for efficient harvesting that the shaker head be quickly and accurately positioned into engagement with each tree trunk in the grove. The shaker head may be typically carried by an extensible boom which, in turn, is carried by the vehicle. Unfortunately, the shaker is typically relatively heavy, but it should also be positioned accurately and carefully by the boom to avoid damage to the tree trunk. In addition, the shaker head should be quickly engaged and disengaged from the tree trunk for time efficient harvesting of course, the boom itself may be subject to damage by the substantial shaking forces imparted thereto.

SUMMARY OF THE INVENTION

In view of the foregoing background, it is therefore an object of the invention to provide a fruit harvester including a boom that is rugged, reliable, and readily positionable for shaking the trunk of a fruit tree to shake the fruit therefrom.

This and other objects, features and advantages in accordance with the present invention are provided by a fruit harvester which includes a vehicle, a telescoping boom, a shaker head connected to the distal end of the telescoping boom for vibrating a tree to shake fruit therefrom, and a boom positioning assembly for connecting the boom to the vehicle. More particularly, the boom positioning assembly may include a vertical guide mounted to the vehicle, and a hinge joint assembly movable vertically along the vertical guide and connected to the proximal end of the telescoping boom. The hinge joint assembly may advantageously permit pivotal movement of the telescoping boom in both elevational and azimuthal directions, in some embodiments. In addition, the boom positioning assembly may also include a vertical actuator for moving the hinge joint assembly vertically along the vertical guide, and an elevational actuator for pivotally moving the telescoping boom in the elevational direction.

The vertical guide may also be pivotally connected to the vehicle, and the boom positioning assembly may also include a tilt actuator for tilting the vertical guide relative to the vehicle. Accordingly, the boom may be readily and accurately positioned to grasp the trunk of a tree, and repositioned to move to the next tree.

The telescoping boom may have a suspension position located in spaced-apart relation from the distal end thereof. Accordingly, the elevational actuator may be connected to this boom suspension position. Moreover, the elevational actuator may include an arm having a proximal end rotatably carried by the hinge joint assembly, an elongate suspension member extending between the distal end of the arm and the suspension position along the telescoping boom, and a drive for selectively rotating the arm. The drive may comprise at least one hydraulic cylinder selectively operated from a hydraulic power unit of the vehicle. The telescoping boom may thus be accurately positioned in an elevational direction.

The elongate suspension member may cooperate with the hinge joint assembly to permit dampened azimuthal movement of the telescoping boom. The elongate suspension member may be provided by at least one chain, for example.

The vertical actuator may also comprise at least one hydraulic cylinder selectively operated from the hydraulic power unit. Thus, the entire telescoping boom may be readily raised and lowered by the vertical hydraulic cylinder.

The tilt actuator may also comprise at least one hydraulic cylinder selectively operated from the hydraulic power unit.

The vertical guide may comprise a pair of spaced-apart vertical guide rails. The hinge joint assembly may comprise a mounting base for slidably engaging the vertical guide rails, a first hinge bracket connected to the mounting base, a second hinge bracket connected to the proximal end of the telescoping boom, and a hinge body having first and second orthogonal passageways therethrough. The hinge joint assembly may also include a first hinge pin extending through the first passageway and the first hinge bracket, and a second hinge pin extending through the second passageway and the second hinge bracket. Accordingly, a relatively straightforward and robust hinge is provided to permit both elevational and slight azimuthal movement.

The telescoping boom may include a proximal boom section and a distal boom section. The boom positioning assembly may further include at least one boom extension/retraction actuator connected between the proximal and distal boom sections for permitting extension and retraction. This extension/retraction actuator may also be hydraulically powered from the vehicle hydraulic power unit.

The boom positioning assembly may be carried by the forward end of the vehicle. The fruit harvester may also include a fruit deflector carried by the telescoping boom. In addition, the vehicle may comprise a chassis, an engine carried by the chassis, and a pair of opposing tracks carried by the chassis and driven by the engine. The tracks provide good maneuverability within a grove, for example. The shaker head may comprise a vibrator unit and a pair of jaws connected thereto for grasping and shaking the tree at its trunk.

A method aspect of the invention is for shaking fruit from a tree using a harvester comprising a vehicle, a telescoping boom having a distal end carried by the vehicle, and a shaker head connected to a distal end of the telescoping boom. The method may include vertically positioning a hinge joint assembly along at least one vertical guide carried by the vehicle and connected to the proximal end of the telescoping boom to also permit pivotal movement of the telescoping boom in both elevational and azimuthal directions. In addition, the method may include pivotally moving the telescoping boom in the elevational direction and extending the telescoping boom to position the shaker head for grasping and vibrating a tree trunk to shake fruit from the tree.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout and prime notation is used to indicate similar elements in alternate embodiments.

Figure 1:
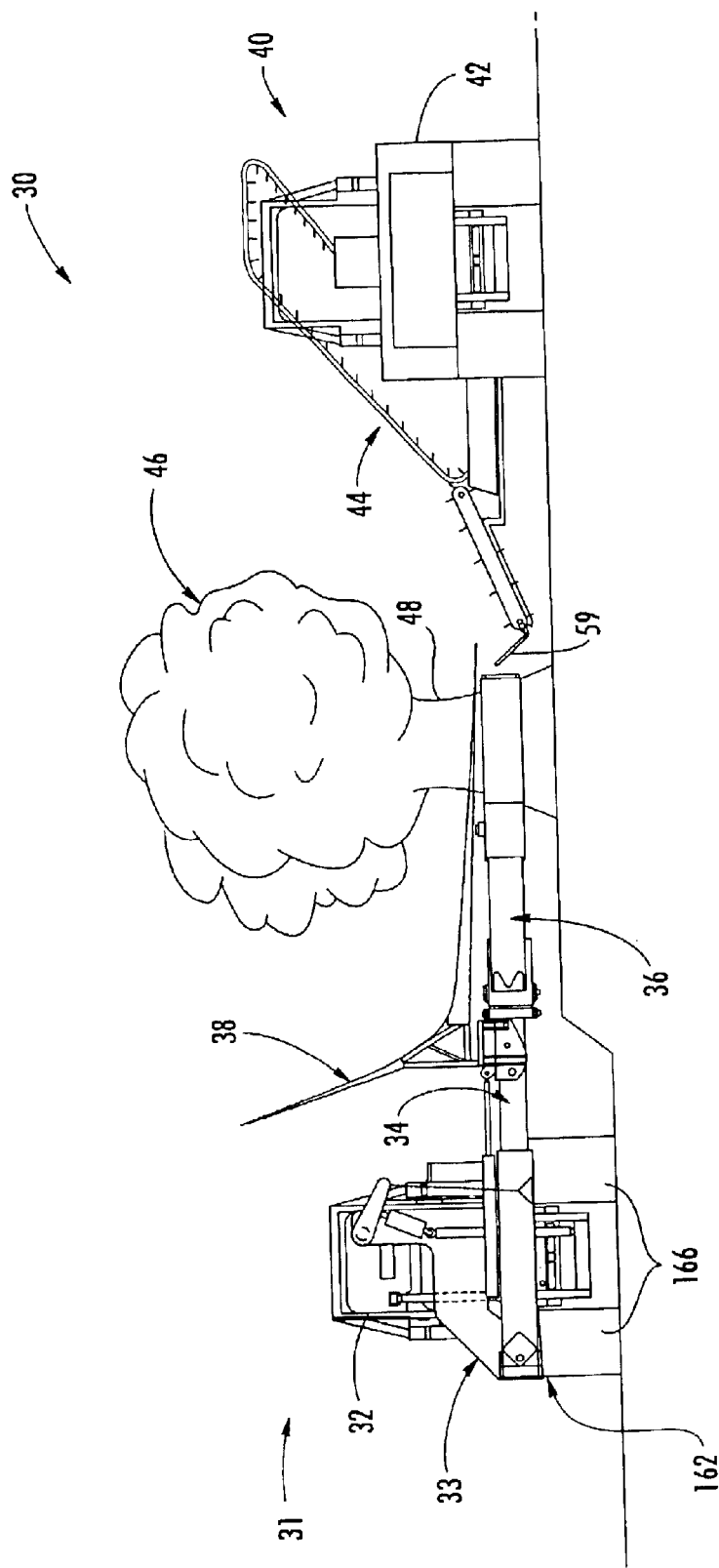
FIG. 1 is a schematic front elevation view of the harvester system in accordance with the present invention.
Figure 2A:
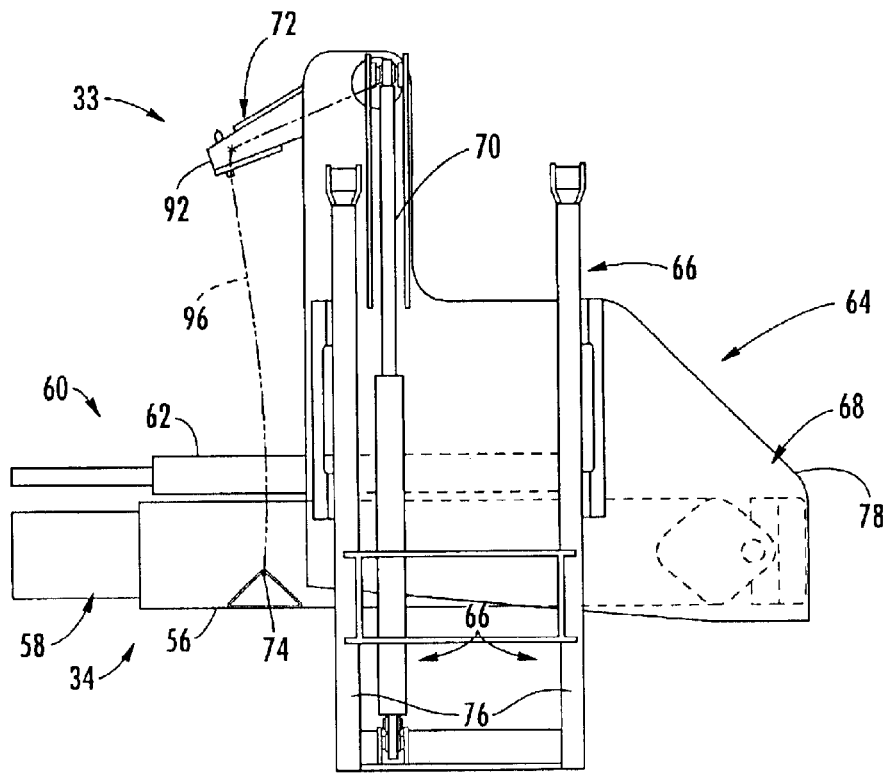
FIGS. 2A and 2B are rear elevational views of the boom positioning assembly removed from the harvester as shown in FIG. 1 and illustrating the boom assembly in vertically raised and lowered positions, respectively.
Figure 2B:
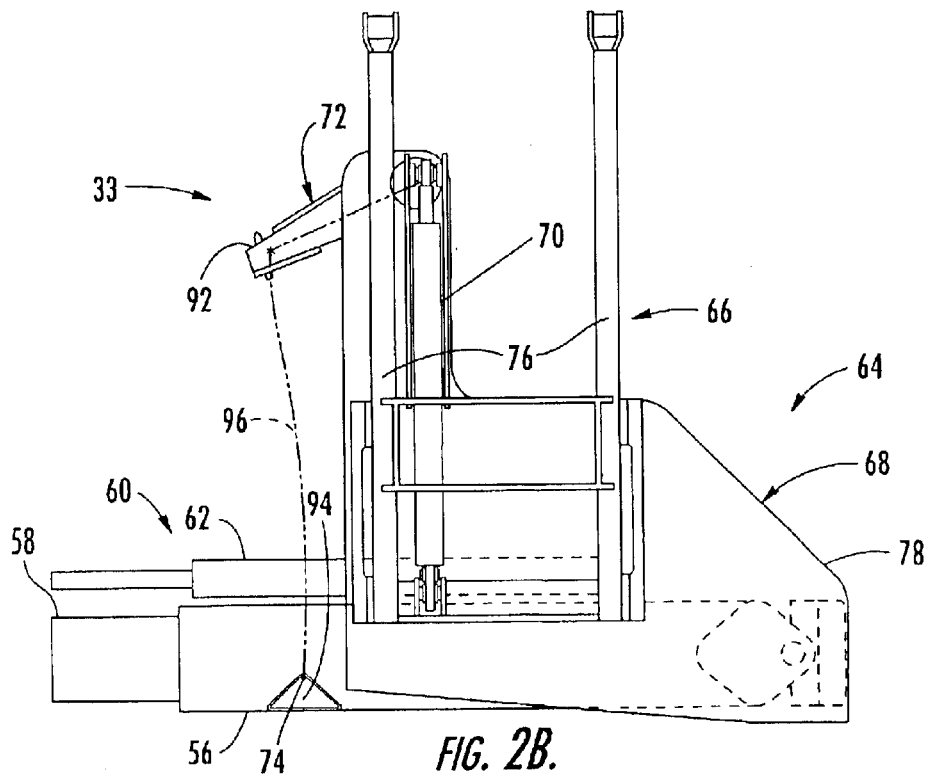
Figure 3A:
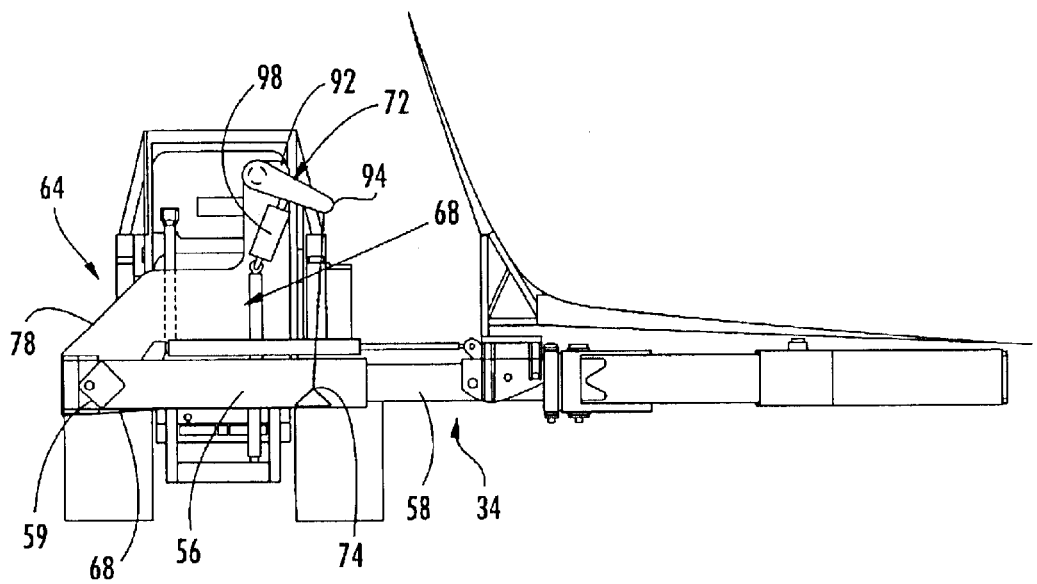
FIGS. 3A and 3B are front elevational views of the harvester as shown in FIG. 1 and illustrating the boom positioning assembly in vertically raised and lowered positions, respectively.
Figure 3B:
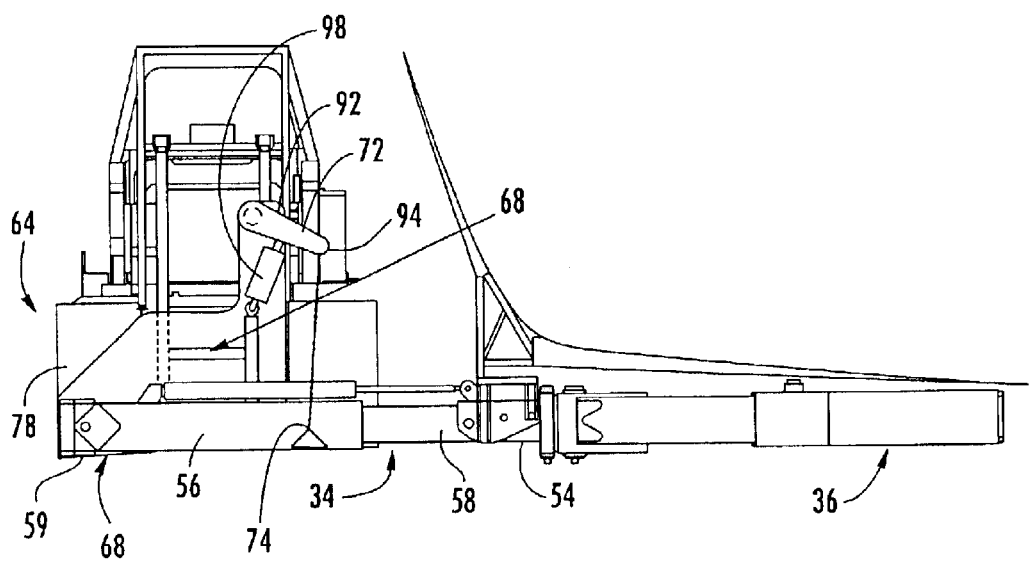
Figure 4:
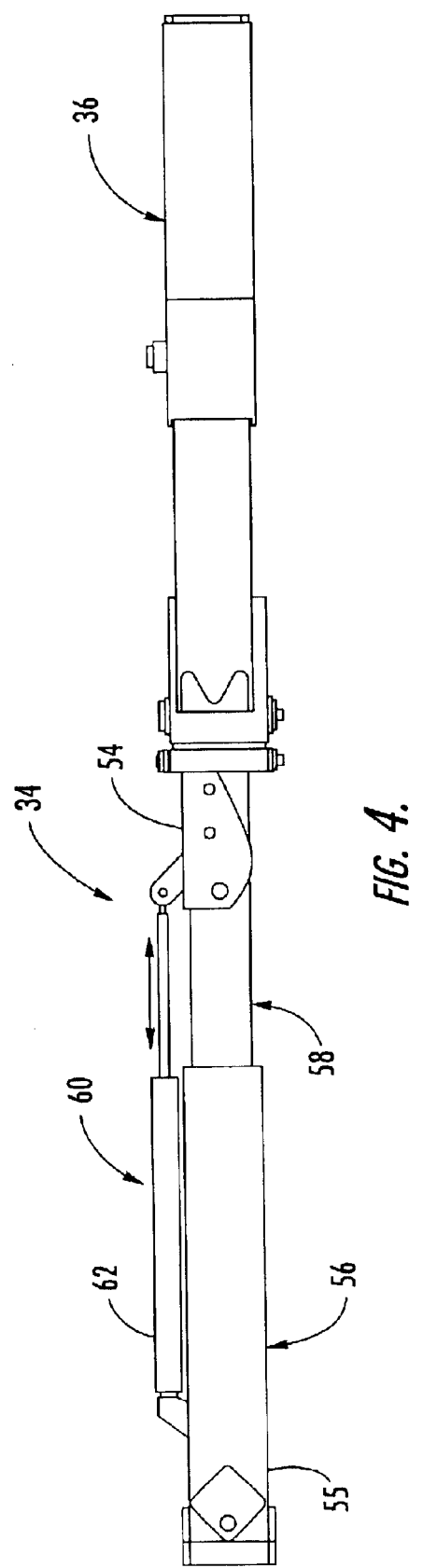
FIG. 4 is a side elevational view of a portion of the boom positioning assembly and boom of the harvester as shown in FIG. 1.
Figure 5:
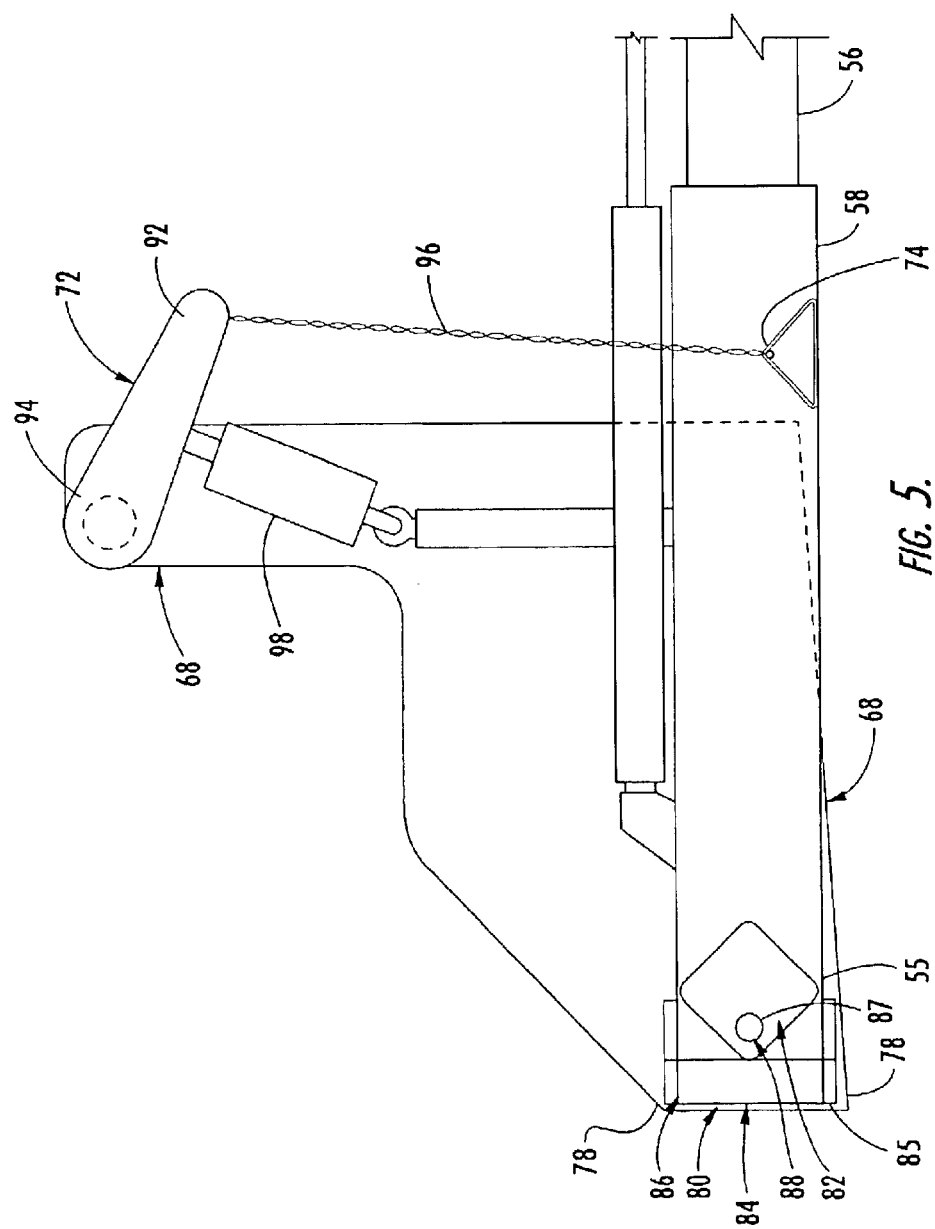
FIG. 5 is a front elevational view of a portion of the boom positioning assembly and boom of the harvester as shown in FIG. 1.

Referring initially to FIG. 1, a fruit harvesting system 30 according to the invention is described. The fruit harvesting system 30 illustratively comprises a fruit harvester 31, which, in turn, comprises a shaker vehicle 32, a boom assembly 33 carried by the shaker vehicle, a shaker head 36 carried by the boom assembly, and a fruit deflector 38 carried by the boom assembly. The fruit harvester system 30 also comprises, as shown in the righthand portion of FIG. 1, a fruit collection apparatus 40. The fruit collection apparatus 40, in turn, comprises a collector vehicle 42 and a fruit collector 44 carried by the collector vehicle.

The fruit harvester 31 and the fruit collection apparatus 40 of the fruit harvesting system 30 operate cooperatively with one another in accordance with the principles of shake and catch technology as will be appreciated by those skilled in the art. With the shaker vehicle 32 positioned adjacent a particular tree 46, the boom assembly 33 carried by the vehicle readily and accurately positions the boom 34 and thus shaker head 36 with respect to the tree. So positioned, the shaker head 36 is operated to grasp and vibrate the trunk 48 of the tree 46. As the tree 46 vibrates, fruit falls from the tree and is deflected by the fruit deflector 38 so that the fruit collection apparatus 40 is able to collect the fruit. The fruit collection apparatus 40 includes a movable seal 59 that is positioned to prevent fruit from falling between the two collection surfaces as will be appreciated by those skilled in the art.

Referring now additionally to FIGS. 2A–5 the boom assembly 33 illustratively includes a boom 34 and boom positioning assembly 64. The boom 34 is a telescoping boom that includes a proximal boom section 56 and a distal boom section 58. The distal boom section 58 slidably moves within the proximal boom section 56 to thereby increase and decrease the length of the boom 34 accordingly, as will be readily understood by those skilled in the art. The boom assembly 33 further includes a boom extension/retraction actuator 60 connected between the proximal and distal boom sections 56, 58. The extension/retraction actuator 60 illustratively comprises a hydraulic cylinder 62 and can be selectively operated from a hydraulic power unit (not shown) of the vehicle 32. As will be readily appreciated by those skilled in the art, however, various other arrangements are also contemplated by the present invention to extend and retract the telescoping boom 34.

The boom positioning assembly 64 also comprises a vertical guide 66 and a hinge joint assembly 68 carried by the vertical guide. The vertical guide 66 mounts to the vehicle 32, and the hinge joint assembly 68 moves vertically along the vertical guide. The hinge joint assembly 68 connects to the proximal end 55 of the telescoping boom 34. As the hinge joint assembly 68 moves along the vertical guide 66, it raises and lowers the connected telescoping boom 34.

The boom positioning assembly 64 also comprises a vertical actuator 70 for moving the hinge joint assembly 68 vertically along the vertical guide 66. In addition, the boom positioning assembly 64 illustratively includes an elevational actuator 72 for pivotally moving the telescoping boom 34 in an elevational direction. The elevational actuator 72, moreover, connects to a boom suspension position 74 located on the boom 34 and spaced apart from the distal end 54 thereof.

The vertical guide 66 illustratively comprises a pair of spaced-apart vertical guide rails 76, and the hinge joint assembly 68 comprises a mounting base 78 that slidably engages both vertical guide rails. The hinge joint assembly 68 also comprises a first hinge bracket 80 connected to the mounting base, a second hinge bracket 82 connected to the proximal end of the boom 34, and a hinge body 84 having first and second orthogonal passageways 86, 88 extending through the hinge body. In addition, the hinge joint assembly 68 illustratively includes first and second hinge pins 85, 87 that extend, respectively, through the first and second orthogonal passageways 86, 88. As will be readily appreciated by those skilled in the art, a robust hinge is thereby provided that permits both elevational and azimuthal movements of the boom 34 for accurate positioning to engage the shaker head 36 to the tree trunk.

To reduce potentially undesirable swinging of the boom 34 as the vehicle is moved, one or more elastomeric bumpers, not shown, may be used to restrain movement of the boom beyond a predetermined range. For example, a U-shaped bracket or channel could be positioned to surround the boom 34 and an inner surface of the bracket could carry the bumpers. Of course, many other restraint configurations are also contemplated by the present invention.

The vertical actuator 70, more specifically, may be provided as shown in the illustrated embodiment by a hydraulic cylinder 98 that is selectively operated from the hydraulic power unit of the shaker vehicle 32. Operation of the vertical actuator 70 causes the hinge joint assembly 68 to move vertically along the vertical guide 66 so that the entire telescoping boom 34 may be readily raised and lowered. The elevational actuator 72 that connects to the boom suspension position 74, more particularly, comprises an arm 92 having a proximal end 94 rotatably carried by the hinge joint assembly 68. The elevational actuator 72 also includes a chain 96, defining an elongate suspension member, that extends from the distal end of the arm to connect to the boom suspension position 74. The elevational actuator 72 further includes a drive comprising a hydraulic cylinder 98 for selectively rotating the arm 92, the hydraulic cylinder being selectively operated from the hydraulic unit of the shaker vehicle 32 in some preferred embodiments. The elongate suspension member 74, moreover, cooperates with the hinge joint assembly 68 to permit dampened azimuthal movement of the boom.

Figure 6A:
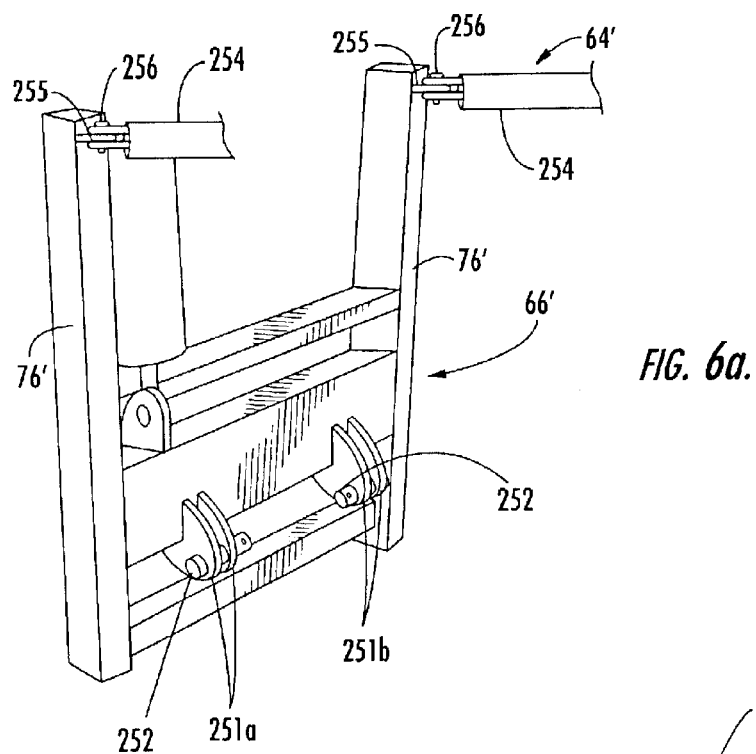
FIGS. 6A and 6B are perspective and schematic side views of an alternate boom positioning assembly including a tilting arrangement therefor.
Figure 6B:
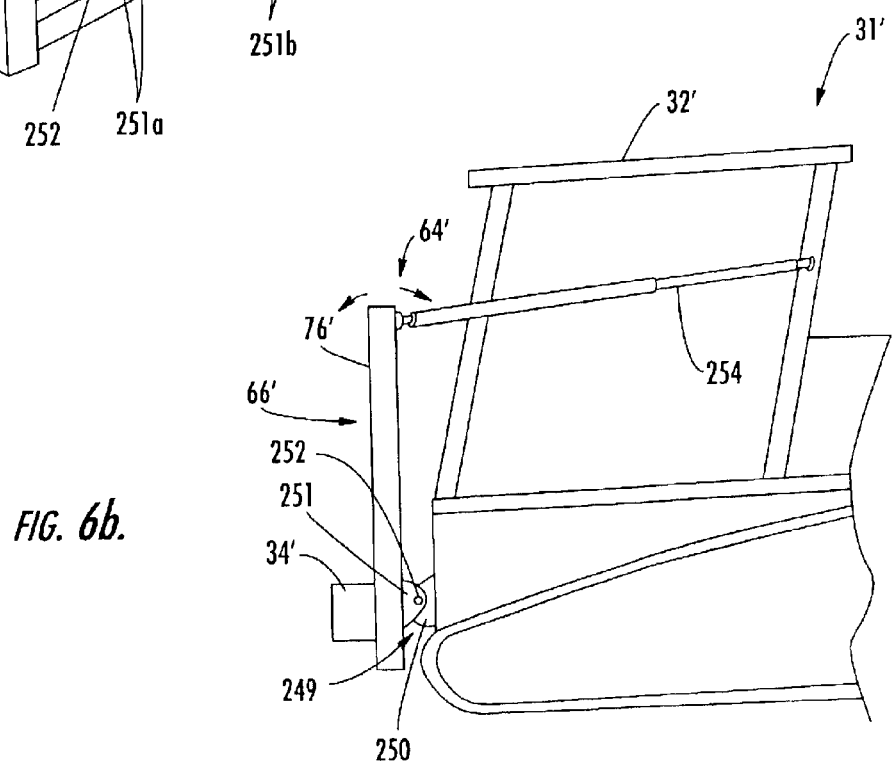

Referring now additionally to FIGS. 6A and 6B another aspect of orienting or positioning the boom positioning assembly 64' relative to the vehicle 32' is now described. The boom positioning assembly 64' may be tilted to permit more maneuverability of the shaker head, provide better clearance, etc. to thereby facilitate harvesting of the first and/or last tree or trees of a row whereat the elevation of the ground is likely to change. In the illustrated embodiment, the vertical guide 66' is pivotally mounted to the vehicle 32', and the boom positioning assembly further comprises a tilt actuator for tilting the vertical guide relative to the vehicle. The tilt actuator illustratively comprises a pair of hydraulically operable actuators 254 on opposite sides of the vehicle.

A mounting bracket 249, one ear 250 of which is shown in the schematic side elevational view of FIG. 6B, pivotally mounts the vertical guide at its corresponding pairs of ears 251a, 251b using the pins 252. The mounting bracket 249 illustratively mounts the vertical guide 66' to the front of vehicle 32'. Indeed, this bracket 249 can be readily optionally substituted or otherwise adjusted in some embodiments to set an initial height of the vertical guide.

Upper ends of the vertical guide 66' are attached to respective ends of the hydraulic tilt actuators 254 by respective brackets 255 and locking pins 256. Those of skill in the art will appreciate that there are many other equivalent tilt actuating arrangements as contemplated by the present invention.

In some embodiments, this tilting feature may not be needed. In addition, in other embodiments, the tilting feature may be used with the vertical positioning and/or elevational positioning, for example.

Figure 7:
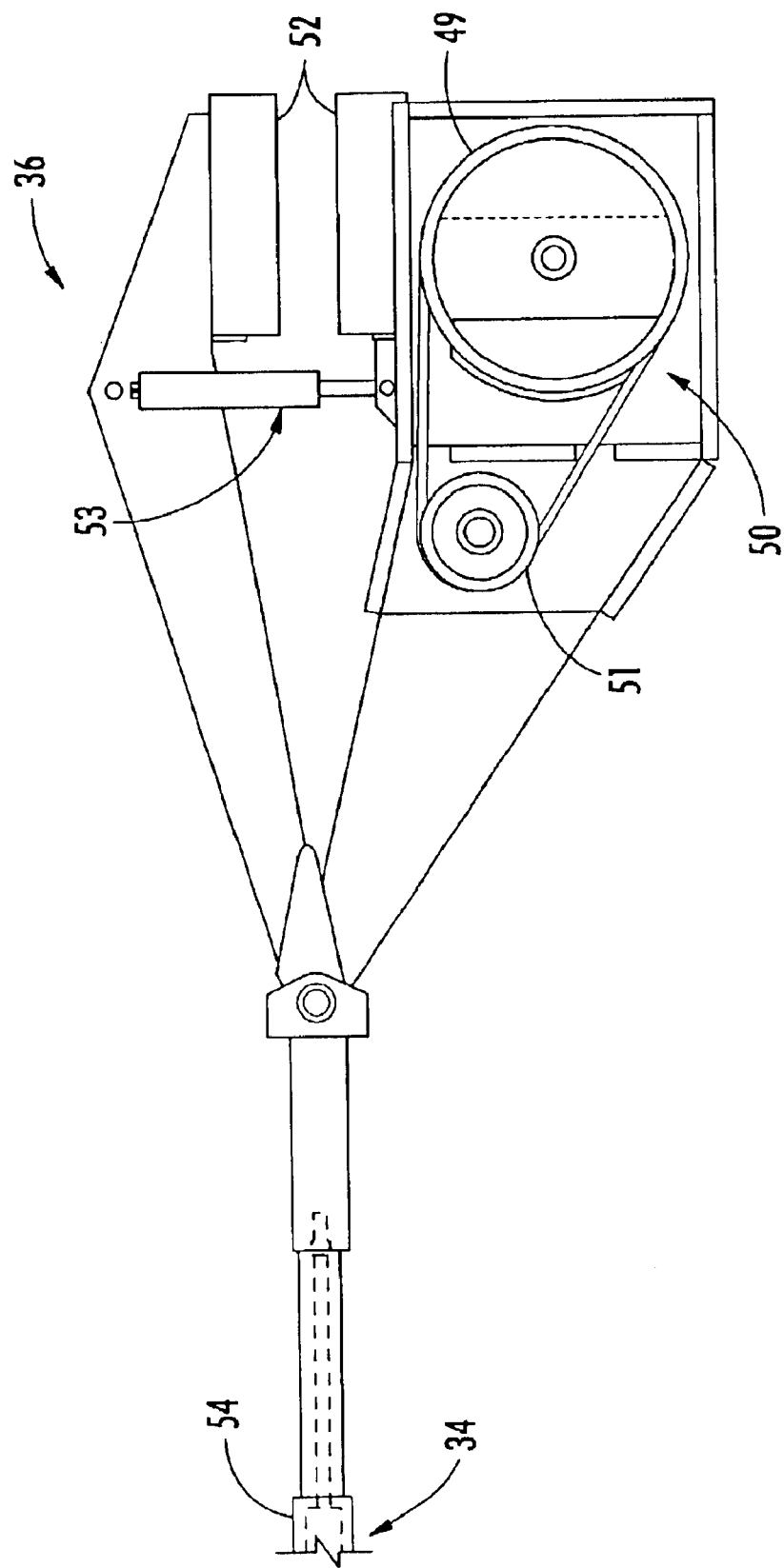
FIG. 7 is a top plan view of a portion of the boom and shaker head of the harvester as shown in FIG. 1.

The shaker head 36 is illustratively connected to the distal end 54 of the boom 34. With additional reference to FIG. 7, the shaker head 36 illustratively comprises a vibration unit 50 and jaws 52 connected thereto to grasp and hold a tree trunk while the vibration unit shakes the tree so that fruit is dislodged from the branches of the tree. The vibration unit 50 illustratively comprises an eccentrically-weighted wheel 49 driven by a hydraulic motor 51. In addition, a hydraulic cylinder 53 illustratively opens and closes the jaws 52. The vibration unit 50 of the shaker head 36, accordingly, can also be selectively driven by the hydraulic unit of the vehicle 32.

Figure 8:
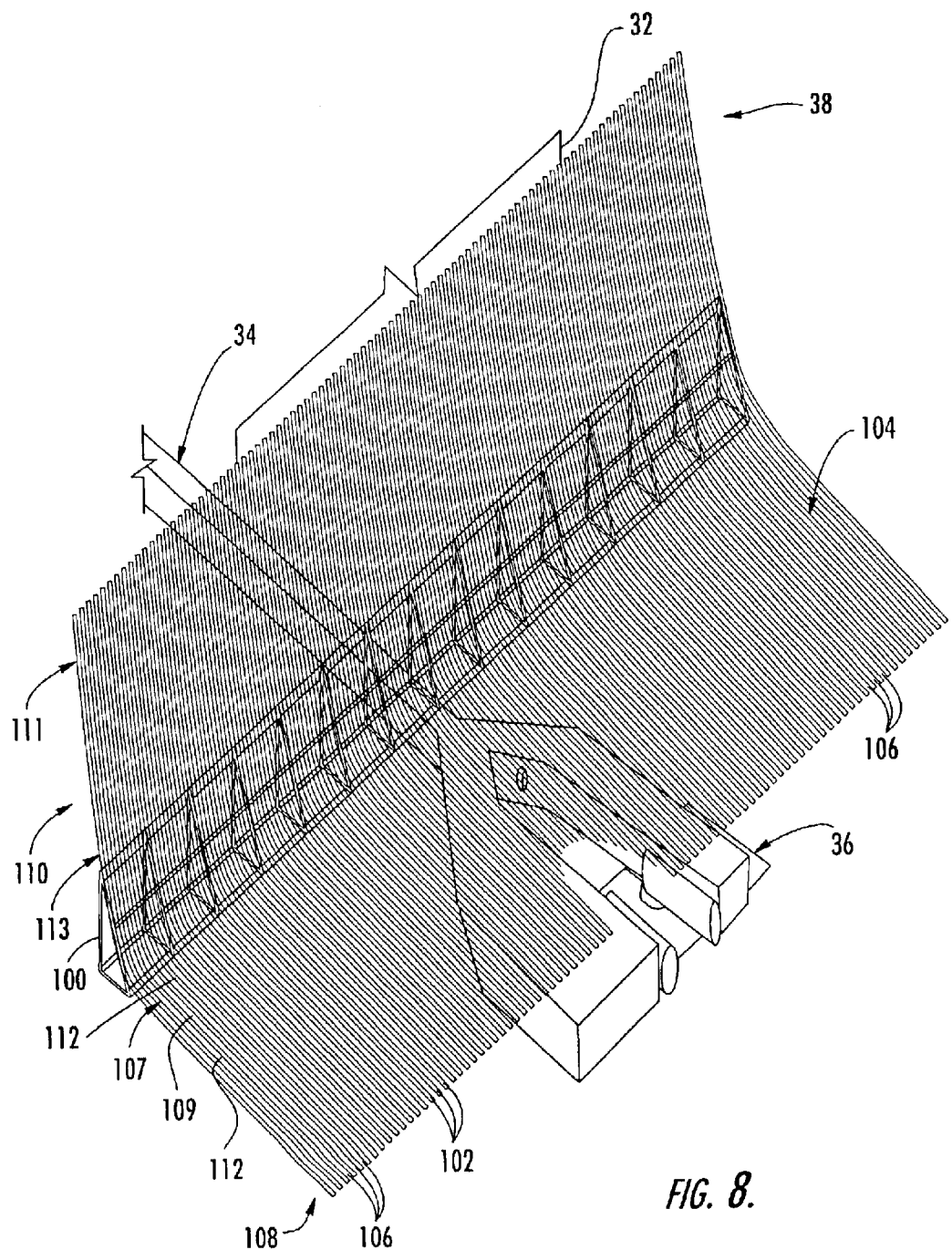
FIG. 8 is a perspective view of the fruit collector of the harvester as shown in FIG. 1.
Figure 9:
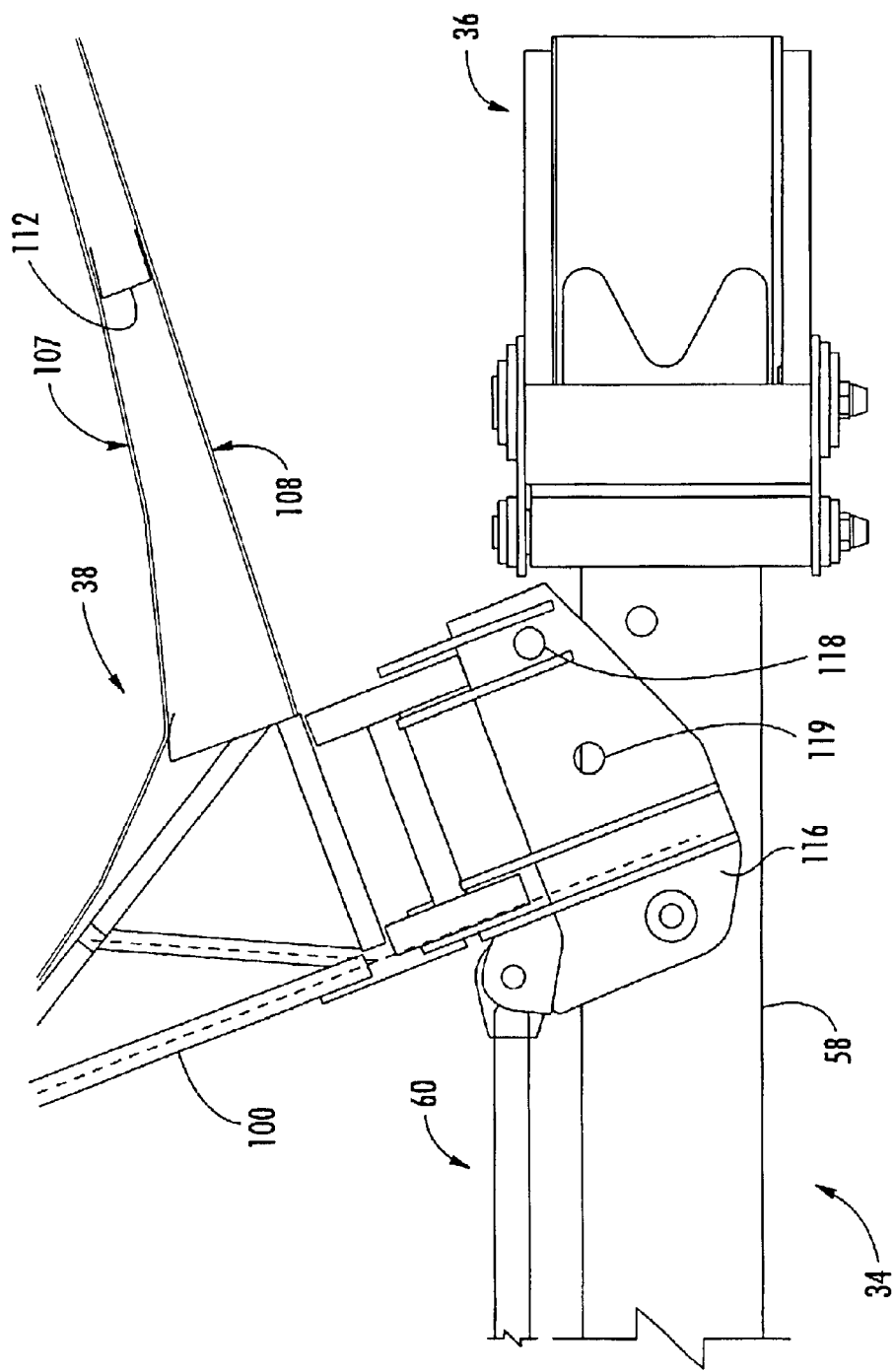
FIG. 9 is a side elevation view of a portion of the boom and fruit deflector of the harvester as shown in FIG. 1.

Referring now additionally to FIGS. 8 and 9, the fruit deflector 38 is further described. The fruit deflector 38 includes a frame 100 that is illustratively connected to the boom 34 adjacent the shaker head 36. The fruit deflector also includes a plurality of flexible elongate members 102 carried by the frame 100. The frame 100 vibrates as the vibration unit 50 of the shaker head 36 shakes a tree. Accordingly, the flexible elongate members 102 of the fruit deflector 38 vibrate with the frame 100. The flexible elongate members 102 of the fruit deflector 38 jointly define a vibrating fruit collecting surface 104 for catching fruit dislodged from the tree. This vibrating collecting surface 104 can speed downward movement of the fruit, as well as help clear the surface of debris which also assists downward movement of the fruit as will be appreciated by those skilled in the art.

The frame 100 of the fruit deflector 38 is elongate, extends in a horizontal direction and is provided by an elongate truss in the illustrated embodiment. The frame 100 rigidly connects to the boom 34 and the frame itself is generally rigid, yet relatively lightweight to aid in coupling vibrational energy to the collecting surface 104. The flexible elongate members 102 are arranged relative to one another in a spaced-apart, side-by-side relation on the frame 100. In this spaced-apart, side-by-side relation, the flexible elongate members also define slotted openings 106 through which trash, tree limbs, and other debris pass when dislodged from a tree as it is shaken. The flexible elongate members 102, however, are nevertheless close enough to one another to catch fruit, particularly citrus fruit, as it falls from the tree. The elongate flexible members 102 may comprise fiberglass, for example. However, it may be advantageous in some embodiments to form lower end portions of a more rugged material, such as Hytrel® thermoplastic polyester elastomers available from DuPont, although other materials may be used as will be appreciated by those skilled in the art. In particular, a larger panel portion adjacent the leading lower edge may be formed of such a more rugged material, and/or this panel may be made readily replaceable for maintenance by attachment with removable fasteners. This leading lower edge is likely to contact trees and thereby be subject to damage.

The plurality of flexible elongate members 102, moreover, are arranged so as to define both a lower portion 108 that extends laterally outwardly from the frame 100 and an upper portion 110 that extends vertically outwardly from the frame 100. The lower portion 108 comprises inner and outer lower panels 107, 109 as well as a plurality of spaced-apart lower supports 112 that connect the inner and outer lower panels together.

The upper portion 110 of flexible elongate members 102 also comprises inner and outer upper panels 111, 113, and being arranged in spaced-apart relation. The members of the outer upper panel 113 terminate about halfway up the corresponding members of the inner panel 111, and the members are connected together at this location in the illustrated embodiment.

In other embodiments, the upper portion 110 may also be pivotally connected to the frame 100. This may advantageously permit height adjustment so as to enable better positioning within groves having different canopy heights as will be appreciated by those skilled in the art. For example, predetermined canopy heights could be selected based upon a series of aligned openings and associated locking pins for pivotally connecting the upper portion, although other configurations are also contemplated by the present invention.

The inner lower and the inner upper panels illustratively have arcuate adjacent portions that define an arcuate bight portion of the vibrating fruit collecting surface. The fruit collecting 104 surface may thus advantageously vibrate in a wave motion when a tree trunk is being shaken. This wave motion may be seen as formation a standing wave during operation with nodes at the ends and middle, and with a respective antinode between the middle and each end. Of course, harmonics are also generated as will be appreciated by those skilled in the art.

The fruit deflector 38 is also pivotally connected to the boom 34 so that the fruit deflector can be positioned either in an operating position or in a retracted position. In the operating position, the fruit deflector 38 is pivoted so that the lower portion 108 of the fruit deflector is adjacent the shaker head 36. The fruit deflector 38, in the retracted position, is pivoted upward so that the lower portion 108 extends upward and away from the shaker head. With the fruit deflector 38 in the retracted position, one may gain ready access to the shaker head 36 to thereby service or replace portions thereof.

More particularly, the fruit harvester 30 illustratively includes a fruit deflector mounting bracket 116 positioned on the distal section 58 of the boom 34 to pivotally connect the fruit deflector 38 to the boom. Additionally, the fruit harvester 30 comprises a locking mechanism that cooperates with the fruit deflector mounting bracket 116 and the boom 34. The locking mechanism serves to lock the fruit deflector 38 in at least one of the operating and retracted positions. The locking mechanism, more specifically, includes respective aligned passageways 118 extending into the boom 34 and the fruit deflector mounting bracket 116 along with a removable lock pin (not shown) to be received in the aligned passageways. With the locking pin removed, the boom extension/retraction actuator 60 may pivotally move the fruit deflector mounting bracket 116 thereby moving the fruit deflector 38. A second passageway 119 in the mounting bracket may receive the locking pin when the retracted position to hold the fruit deflector 38 in the retracted position. Of course, other locking arrangements are also contemplated by the present invention as will be appreciated by those skilled in the art.

Figure 10:
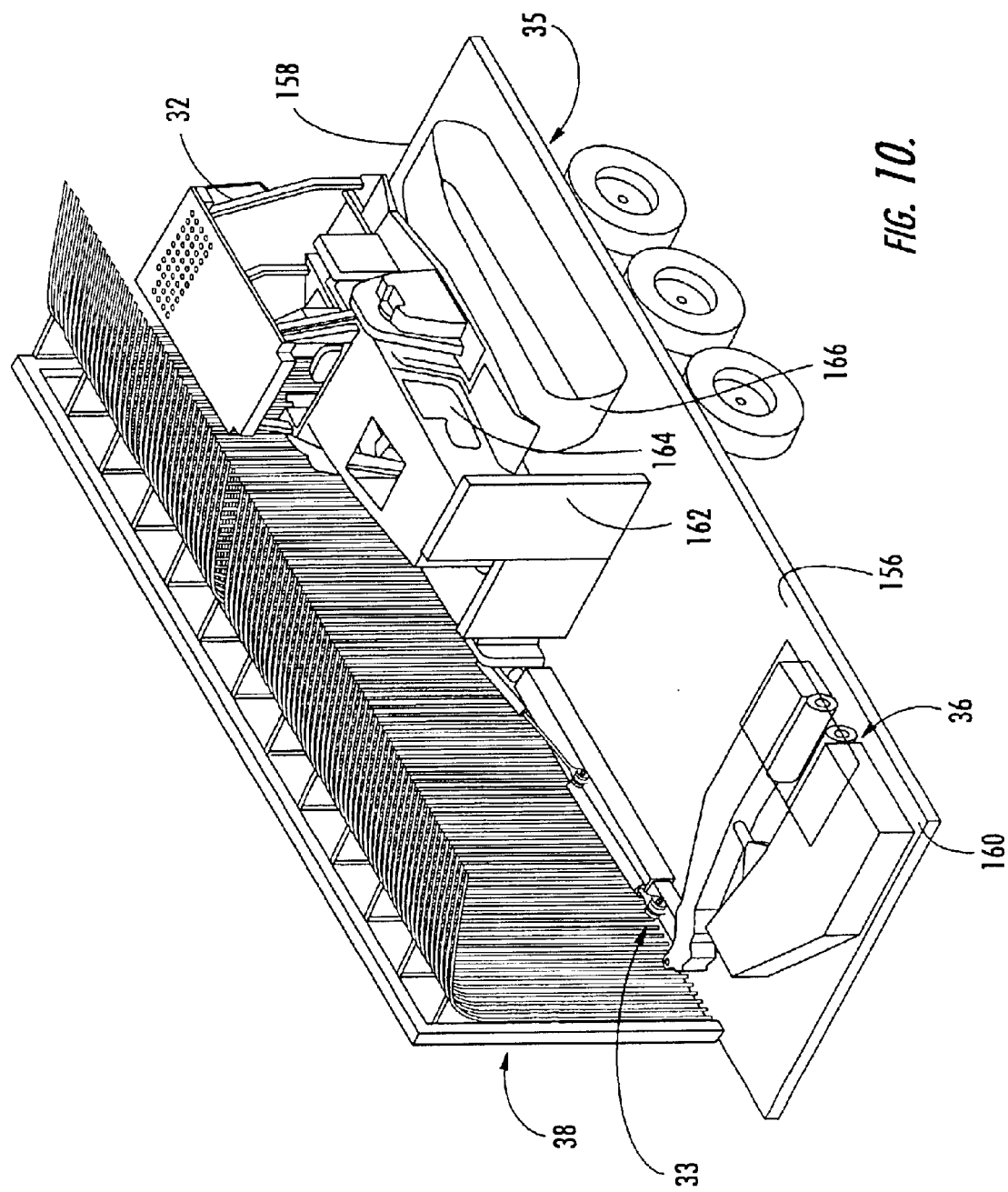
FIG. 10 is a perspective view of the harvester as shown in FIG. 1 in disassembled relation and mounted on a harvester trailer, such as for transportation.

Referring additionally now to FIG. 10, transportation of the fruit harvester 31 in dissembled relation via a harvester transport trailer 35 is described in greater detail. The harvester transport trailer 35 comprises respective areas for mounting the shaker vehicle 32, the modular boom assembly 33, and the modular fruit deflector 38 when all are in disassembled relation. More particularly, the fruit harvester transport trailer 35 comprises a rectangular upper surface 156 having first and second opposing ends 158, 160.

The shaker vehicle 32 illustratively comprises a chassis 162, an engine 164 carried by the chassis, and a pair of tracks 166 carried by the chassis and driven by the engine. The shaker vehicle 32 may be based upon an ASV 4810 Posi-Track all-purpose crawler, for example, although those of skill in the art will recognize that other similar vehicles may also be used. For better balance the track opposite the shaker head 36 may be extended outwardly from the vehicle chassis. In addition, or in the alternative, counterweights may also be carried by this opposite side of the vehicle 32.

With each of these vehicle components intact, but with the modular boom assembly 33 and the modular fruit deflector 38 disconnected from the shaker vehicle 32, the vehicle is mounted on the harvester transport trailer 35. For example, the shaker vehicle 32 may be driven up a ramp onto the transport trailer 35. When mounted on the harvester transport trailer 35, the vehicle may have its longitudinal axis parallel to the rectangular upper surface 156.

The modular fruit deflector 38, when disconnected from the boom assembly 33, is illustratively mounted so that its lower portion 108 extends along a side of the rectangular upper surface 156 between the first and second ends 158, 160, with the upper portion 110 of the fruit deflector 38 extending over the shaker vehicle 32 also mounted thereon. Additionally, the shaker vehicle 32 can be mounted adjacent the first end 158 of the rectangular upper surface 156 with the modular boom assembly 33 having been disconnected from the shaker vehicle 32 and mounted adjacent the second end of the rectangular upper surface 156.

The modular shaker head 36 may also be removably connected to the distal end 54 of the boom 34. When disconnected from the boom 34, therefore, the modular shaker head 36 likewise can be mounted on the harvester transport trailer 35. Moreover, the vibration unit 50 of the shaker head 36 is illustratively pivotally connected to the distal end 54 of the boom 34. Accordingly, the vibration unit 50 is movable between an extended operating position for shaking a tree and an angled storing position, in which it also can be mounted compactly on the fruit harvester transport trailer 35.

The modularity of each of the shaker vehicle 32, the modular boom assembly 33, and the modular fruit deflector 38 permits the fruit harvester to be compactly mounted on the fruit harvester transport trailer 35 when in disassembled relation. Indeed, the width of the fruit harvester transport trailer 35 may be less than about eight feet. Accordingly, there is less likelihood that special permits will be needed for transporting the fruit harvester 31 from one grove to another. Moreover, modularity permits more efficient maintenance of the fruit harvester 31 since whole assemblies may be individually replaced or removed separately for repair.

Figure 11B:
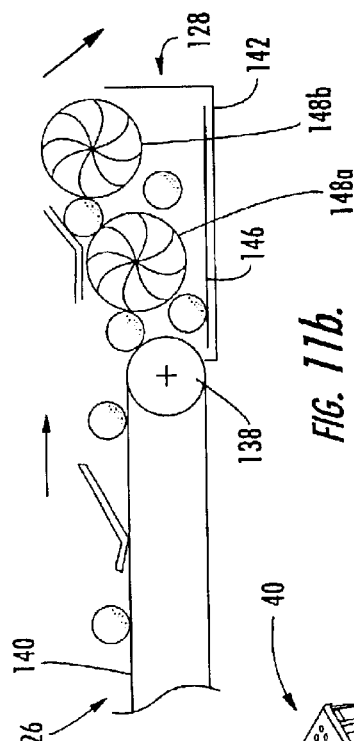
FIG. 11B is a schematic side elevational view of a portion of the fruit collection apparatus as shown in FIG. 11A illustrating separation and removal of debris from the fruit.
Figure 11A:
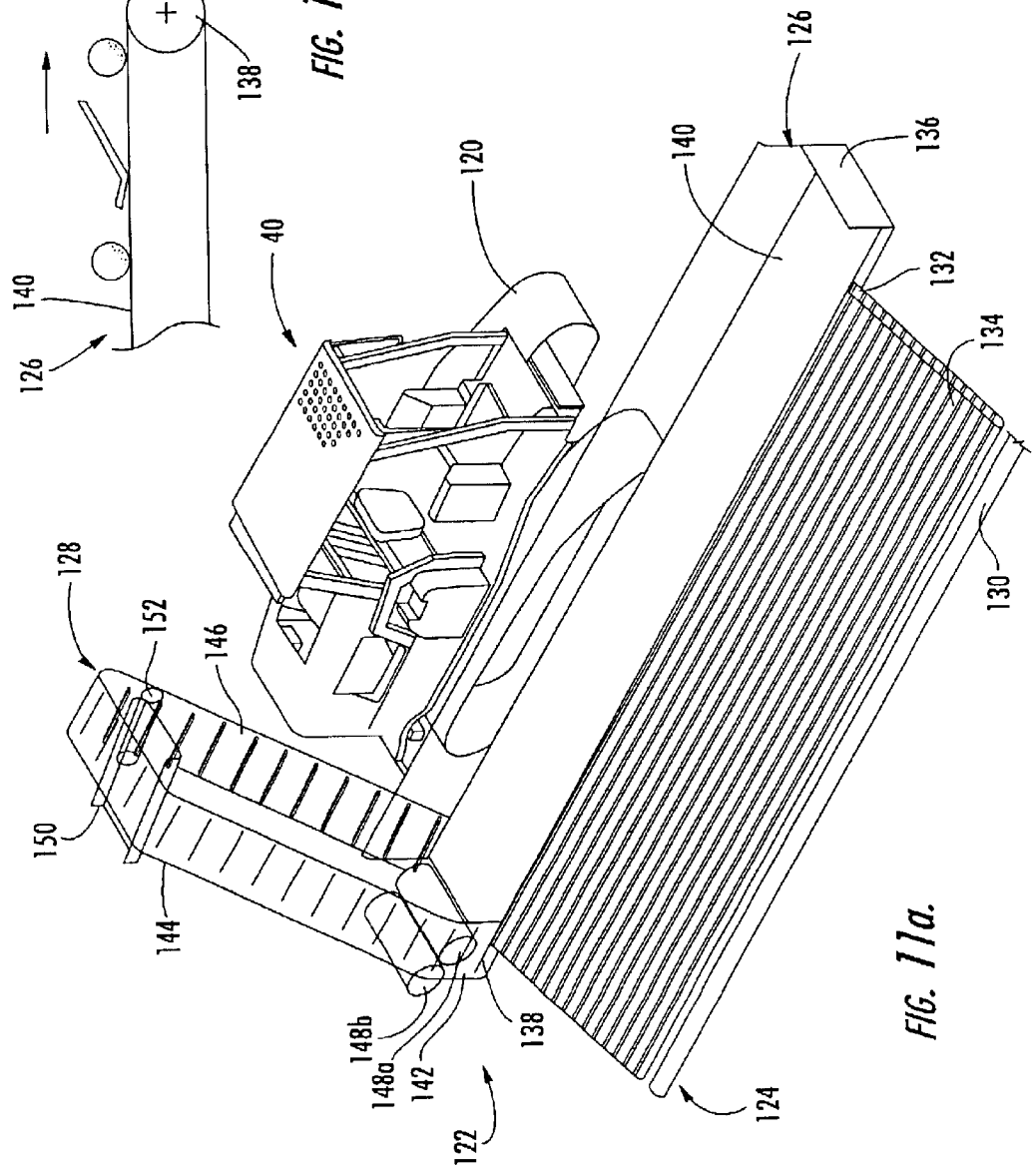
FIG. 11A is a perspective view of the fruit collector apparatus of the harvester system as shown in FIG. 1.
Figure 12:
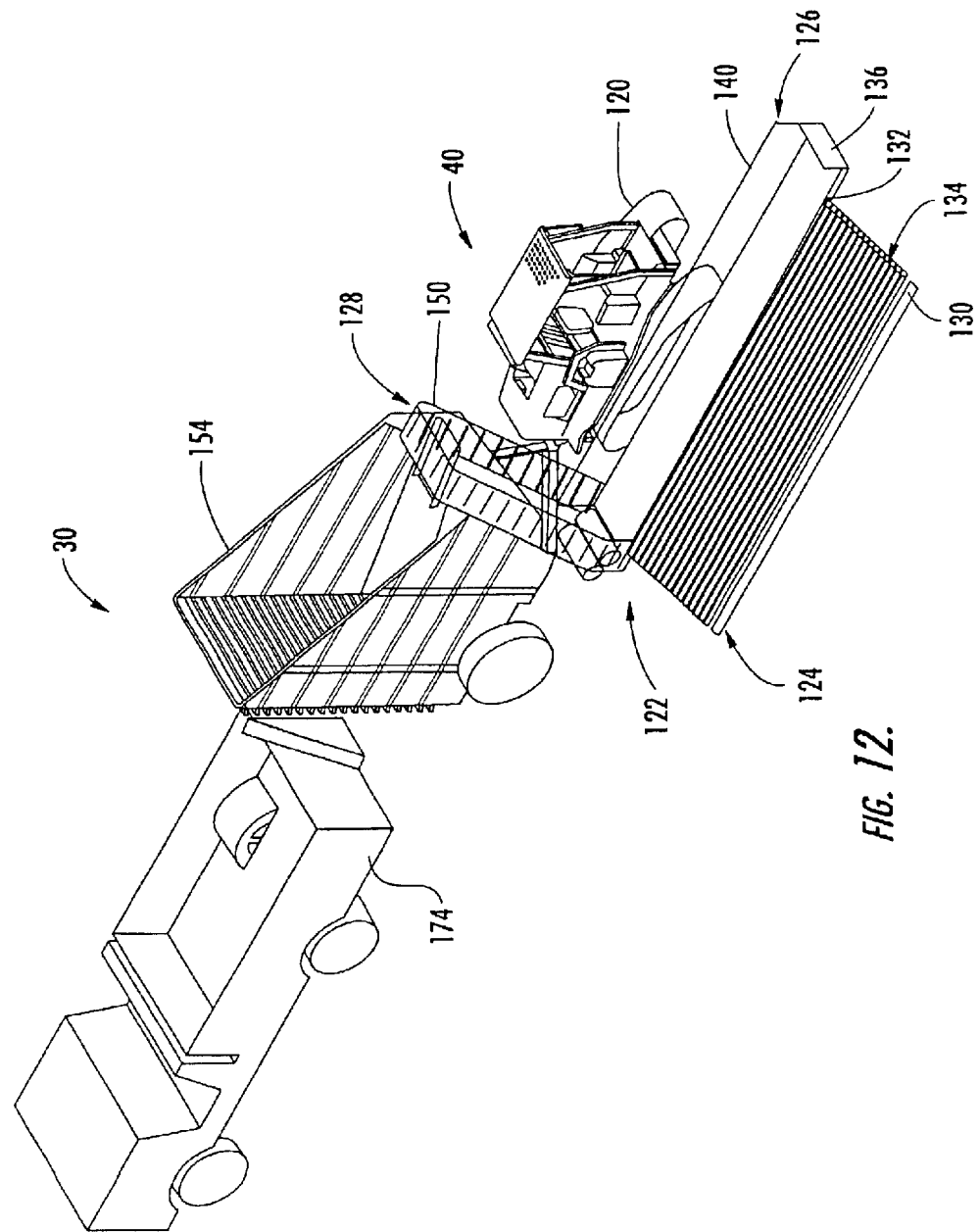
FIG. 12 is a perspective view of the fruit collector apparatus, fruit trailer, and fruit removal vehicle of the fruit harvester as shown in FIG. 1.

With reference now to FIGS. 11A and 11B, the fruit collection apparatus 40 for collecting fruit comprises a collector vehicle 120 and a fruit collector 122 carried by the vehicle. The fruit collector 122 illustratively includes three cooperating conveyors, namely, a first conveyor 124, a second conveyor 126, and a third conveyor 128. The first conveyor 124 may also be considered and is also referred to herein as a collection conveyor. The second conveyor 126 may be considered an intermediate conveyor, and the third conveyor 126 may be considered a lifting conveyor.

The first conveyor 124 has opposing first 130 and second 132 ends as well as an exterior conveyor surface 134 extending therebetween. The first conveyor 124 collects fruit as the fruit is shaken from the tree. Specifically, the fruit deflector 38 deflects fruit to the first conveyor and the first conveyor directly collects a portion of the dislodged fruit. The exterior conveyor surface of the first conveyor 124 is inclined such that the first end is lower than the second end, the ends thus defining respectively lower and upper ends of the first conveyor. Fruit is conveyed by the exterior conveyor surface 134 to the second conveyor 126.

This first or collection conveyor 124 may also be connected to the vehicle 120 via an extensible actuator, not shown, to permit more accurate positioning. In addition, the collection conveyor 124 may also be angularly positionable in yet other embodiments with suitable positioners and mounting arrangements. Yet further, the entire fruit collector 122 may be pivotally connected at one end of the vehicle 120 and releasably connected at the other end to permit the fruit collector to be swung away from the vehicle, such as to permit track maintenance, for example.

The second conveyor 126 of the fruit collector 122 has opposing first and second ends 136, 138 and an exterior conveyor surface 140 extending therebetween for receiving fruit from the first conveyor. The fruit is advanced to the second end 138 of the second conveyor 126.

The third conveyor 128 has lower and upper ends 142, 144 and an interior conveyor surface 146 extending therebetween. Fruit is picked up from the second end 138 of the second conveyor 126 by the interior conveyor surface 146 of the third conveyor 128, which lifts the fruit upward to the upper end 144 of the third conveyor 128. Thus, the third conveyor 128 provides, in combination with the first and second conveyors 124, 126, a very compact, yet efficient arrangement of conveyors for collecting fruit after it has been shaken from a tree.

In other embodiments, the third or lifting conveyor 128 may be used directly with the first or collection conveyor 124 without the intermediate conveyor 126. In this embodiment, the lifting conveyor 128 is relatively large and extends along the full length of the first or collection conveyor 124 as will be appreciated by those skilled in the art.

The fruit collector 122 is illustratively positioned so that the first conveyor 124 extends outwardly from a side of the collector vehicle 120. In addition, the second conveyor 126 extends in a horizontal direction parallel to the same side of the collector vehicle 120 between the vehicle and the first conveyor 124. The third conveyor 128 is positioned adjacent an end of the collector vehicle 120, such as the back end, for example.

More particularly, the lower end 142 of the third conveyor 128 surrounds the second end 138 of the second conveyor 126. The fruit collector 122 also includes a pair of rotating trash removal brushes 148a, 148b adjacent the lower end 142 of the third conveyor 128 to direct fruit downward onto the lower end of the third conveyor while directing trash outwardly therefrom as perhaps best appreciated with reference to FIG. 11B. The brushes 148a, 148b may each rotate in the same direction. The fruit collector 122 also comprises a discharge chute 150 within the upper end 144 of the third conveyor 128. A guide roll or drum 152 is provided adjacent the upper end 144 of the third conveyor 128 for directing fruit from the interior conveyor surface 146 into the discharge chute 150. The third conveyor 128 may be formed as an open slat conveyor to thereby also permit trash to pass therethrough as will be appreciated by those skilled in the art.

The third or lifting conveyor 128 raises fruit from the intermediate conveyor 126 to the chute 150 that transfers the fruit to the trailer 154. Mounted tangentially to the second conveyor 126, the third conveyor 128 reduces the distance which would otherwise be required between the trailer 154 and the collector vehicle 120 while enabling the fruit to be raised sufficiently high to gravity discharge into the trailer. The third or lifting conveyor 128 is able to elevate the fruit at a much greater angle than other approaches and while significantly reducing the needed length.

The lifting conveyor 128 in some embodiments may include a positive drive turning two or more cogged belts with tangentially mounted cleats and flat bars, one drive, and three or more driven drums, not shown. The conveyor 128 may also include two side plates of sufficient size to be greater than the height to of the cleats. Unlike typical cleated belts, the lifting conveyor 128 may incorporate cleats with their upper extensions positioned toward the drive and/or driven shafts rather than away from the shafts, making the cleats on the inside portion of the belt. Mounted in parallel with the cleats, flat bars provide support for the fruit and contain the fruit within the conveyor 128. Equally and sufficiently spaced, the cleats and flat bars, allow denser unwanted material such as stones or immature fruit to fall free and clear of the conveyor as will be appreciated by those skilled in the art. In other words, this arrangement allows unwanted material to fall freely from the conveyor 128 without being trapped as would otherwise occur with conventional conveyors.

With a shaft smaller than the drive wheels mounted onto the shaft, the belt 146 is positioned sufficiently far enough away from the outer surface of the drum 152 to allow passage of the cleat over the drum with sufficient distance to clear, while not allowing fruit held within the cleat and flat bars to be smashed against the drum. Fruit is carried by forward motion of the belt and cleat around and over and around the drive drum 152 at which point gravity overcomes this motion and allows the fruit to drop onto the chute 150 positioned adjacent the drive drum 152 and under the belt 146 at a sufficient angle to discharge the fruit. Fruit contacting the discharge chute 150 is removed by both gravity and the inertia of the moving fruit. While the chute 150 in this embodiment is constructed to discharge the fruit in the same direction of movement as the fruit entering the lift conveyor 128, the arrangement is also capable of diverting fruit in the opposite direction.

Referring more specifically to FIG. 11B, prior to entering the lifting conveyor 128, fruit from the second conveyor surface or belt 140 enters the combination of two or more brushes 148a, 148b as described above. Bristles on the brushes 148a, 148b allow denser material to fall between the brush shaft and the discharge of the discharge end 138 of the second conveyor 126. Limbs, leaves and other undesirable material either too light to penetrate the bristles or too long to drop between the first brush 148a and the discharge end 138 of the conveyor 126 are passed to an additional adjacent brush 148b. This brush 148b, also rotating in the direction of the fruit and unwanted material, enables fruit, which might have been carried over from the first brush 148a due to excessive feeding, to fall into the third conveyor lower end 142 beneath the brushes.

Designed to interact with the first brush 148a, the bristles of the second brush 148b are of sufficient strength to keep lighter material from falling between the first and second brushes thus keeping the unwanted material out of the third conveyor lower end 142 below and continuing in a direction that takes the unwanted material out of the conveying system. A third brush, now shown, may be used where the width of the third conveyor lower end 142 is such that two brushes 148a, 148b are not fully capable of preventing the waste from dropping back into the third conveyor. This brush is also added where the amount of fruit entering the third conveyor 128 is of such capacity as to carry over both the first and second brushes 148, thus increasing the area in which the fruit may be dropped into the lifting conveyor lower end 142.

After passing through the area of the brushes 148a, 148b, fruit is deposited onto the lower end 142 beneath the brushes moving tangentially to the flow of fruit entering the brush area. Traveling at a speed sufficient to remove the fruit prior to overloading this conveyor 128, the belt 146 is transferred from a horizontal plane to a vertical angle intended to raise the fruit in a vertical manner. Using a driven shaft whose drums are designed to maintain a distance sufficient to allow the fruit to pass around the shaft, the belt motion lifts the fruit using the cleats mounted to the belt as a support. When the slope of the belt is such that fruit may roll back, a panel is used to contain the fruit. The panel, typically belting material, can be supported by the side plates thus providing a gap sufficient to contain fruit, but not applying continuous pressure to the fruit as it is raised up the third conveyor 128.

Design of the side plates is such that the fruit is prevented from moving to the portion of the belt 146 which is in contact with the drums of both the drive and driven shafts. This enables the drums to make contact with the belt 146 in such a manner as to provide either rotary motion or spacing depending if the drum is mounted to the drive or driven shaft.

The drive shaft of the lifting or third conveyor 128 is powered typically by a hydraulic motor sized to provide sufficient torque and speed to move the fruit. The brushes 148a, 148b may either be driven independently, be driven by the lifting conveyor 128, or be driven by the second feeding conveyor 126 by either a chain and sprocket or other means of transferring motion between conveyors shafts. In some embodiments, the brushes 148a, 148b are linked by chain so as to rotate at the same speed, and are driven by another chain and set of sprockets powered by the second conveyor's driven shaft.

Referring now additionally to FIGS. 12–16, the harvesting system 30 also includes a fruit trailer 154. The fruit trailer 154 is movable with the collector vehicle 120 and can be positioned at the end of the collector vehicle 120 adjacent the third conveyor 128 to receive fruit from the discharge chute 150 of the third conveyor. Having collected the fruit, the fruit collection trailer 154, as explained in greater detail below, periodically loads the fruit to a removal vehicle 174 that can carry the fruit to a harvest collection site. As also explained in greater detail below, the fruit collection trailer 154 is configured to collect a relatively large quantity of fruit. The fruit collection trailer 154 comprises an inclined conveyor 168 that loads the fruit into the removal vehicle without significant risk of bruising or damage to the skin of the fruit.

Were the harvested fruit to be loaded via conventional methods and devices, such as a bucket conveyor, the fruit could be easily damaged by the mechanical digging of the bucket into the heap of fruit. However, when use is made of an inclined conveyor 168, it is possible to take advantage of gravity to load the inclined conveyor, making the use of buckets superfluous. The inclined conveyor 168 comprises rims or ridges 170 on an endless belt 172, as will be readily understood by those skilled in the art. Thus, ridges 170 satisfactorily replace conventional buckets in the loading process.

Conveyors previously have not been practical for such use because they ordinarily require a large amount of space in which to operate. The fruit collection trailer 154, however, overcomes the problem by stowing the conveyor vertically when it is not in use. When the conveyer 168 is in use, it is inclined by tilting the fruit collection trailer 154, which in turn causes the fruit to move onto to the inclined conveyor to thereby unload fruit from the fruit collection trailer to a removal vehicle 174.

The fruit collection trailer 154 further comprises a fruit container 182 and a hitch 176 is provided on a front end for connection to the collector vehicle 120. A pivoting spout 178 is provided at the rear of the fruit container 182. The fruit container 182 is illustratively provided by a four-sided, bottomed box. The four side portions comprise a front wall 184, a back wall 186, and opposing side walls 188, 190 therebetween. The back wall 186 is about two and a half times as high as the opposite front wall 184 and the two opposite side walls 188, 190. The side walls 188, 190 have a trapezoidal shape with a lower side as low as and coupled to the front wall 184, and a higher side as high as and coupled to the back wall 186. Each, however, is substantially perpendicular to the bottom portion 192. The fruit container 182 is configured for minimal external dimensions and maximal internal fruit containment volume. Two wheels 194 are provided and restricted outside measurements prevent impediment of the trailer as it is maneuvered between rows of trees. In other embodiments, tracks may be substituted for the wheels 194 as will be appreciated by those skilled in the art.

The walls 184, 186, 188, 190 of the container 182 are straight and keep the added length of the harvester and of the trailer 154 within a practical length limit (e.g., 2.8 m), while providing enough containment for the collected fruit. As desired, one or more of the walls of the container 182 may be inclined relative to the bottom 192. Usually, the container 182 is filled with fruit to a level below or up to the height of the front wall 184. The width of the fruit collector trailer 154 may be, for example, about 1.8 m.

After collecting fruit, the fruit trailer 154 is tilted backwards from the direction in which it is towed, thus pivoting about the two wheels 194. The translation and tilting mechanisms are explained in detail below.

With the fruit collection trailer 154 tilted backwards, the fruit in the box 182 tends to establish a new fruit level. To prevent loss of collected fruit the back wall 186 is made higher than the opposite front wall 184. This is the reason why it is advantageous for the two opposite side walls 188, 190 to have a height ranging from the height of the front wall to the height of the back wall. The new fruit level, after tilting, now reaches to just below or up to the height of the back wall 186.

The whole width of the back wall 186 spanning between the two opposite sidewalls 188, 190, is configured as a trailer-conveyor. In the collection configuration, when the fruit is conveyed into the fruit collection trailer 154, the trailer, and, hence its conveyor 168, are in a vertical position with respect to the surface on which the trailer is positioned. When the fruit collection trailer 154 is in the tilted position, however, the now inclined bottom portion 192 of the box 182 automatically loads the inclined conveyor 168 of the fruit collection trailer 154 by gravity.

When the fruit collection trailer 154 and its conveyor 168 are in the tilted position, a removal vehicle 174, such as a flatbed truck, is positioned under the tilted fruit collection trailer 154 and its conveyor 168 to load fruit into the removal vehicle to be transported to a harvest collection site. When loading is completed, the tilted fruit collection trailer 154 is redressed to level position, with the difference that the box 182 of the fruit collection trailer is now empty.

Fruit collection beginning with the collection of fruit from the fruit harvester 31 through the loading of the removal vehicle 174 is cost-efficient for many reasons. For one thing, the fruit collection trailer 154 is highly maneuverable. For another, the volume of the fruit container 182 is large and does not impose frequent stops in the harvesting process for unloading. Moreover, the loading of a removal vehicle 174 such as a flatbed truck via a trailer-wide trailer having a conveyor is efficient so that the vehicle and the driver are not immobilized for long periods of time.

In symmetry about the width of the fruit container 182, but below the frame 196, a bi-directional, telescopic trailer boom 198 is retained to protrude ahead of the front wall 184 in parallel to the bottom 192 of the container.

The trailer boom 198 illustratively includes of two portions capable of relative longitudinally aligned translation. A first portion, extendable out and retractable into the boom 198, is a freely suspended portion 200, or piston, engaged with the second portion of the boom 204, which is the outer portion, or cylinder. The boom 198 may have a circular, rectangular, or any practical cross-section, as will be readily understood by one skilled in the art.

At the free end extremity 208 of the piston 200, a female hitch coupling 210 is fixedly retained to couple with a male hitch coupling. The cylinder back extremity 206 which is the closed end of the cylinder 204 is below the bottom 192 of the container 182, and is pivotally coupled to the bottom by a boom pivot 212, located about a fourth of the length of the fruit collection trailer 154 behind the front wall 184. The boom pivot 212 is restrained to motion in a vertical plane. The trailer boom 198 forms a bi-directional power jack that, as will be readily appreciated by those skilled in the art, can be driven hydraulically or powered by an alternate source. The power source may be situated in and controlled from the collector vehicle 42 as it drives the fruit trailer 154 within a fruit grove.

By command, the piston 200 may be extended out of the cylinder 204 to distance the fruit collection trailer 154 away from the fruit collector 44, which is used to load the fruit collection trailer 154 as both are driven by the collector vehicle 42. The distance can be about 30 to 40 cm, for example. This means that the distance between the fruit collector 44 and the front wall 184 of the fruit collection trailer 154 is augmented without disconnecting the hitch 210. Likewise, retraction of the piston 200 into the cylinder 204 returns the container 182 to the collection configuration.

Figure 14:
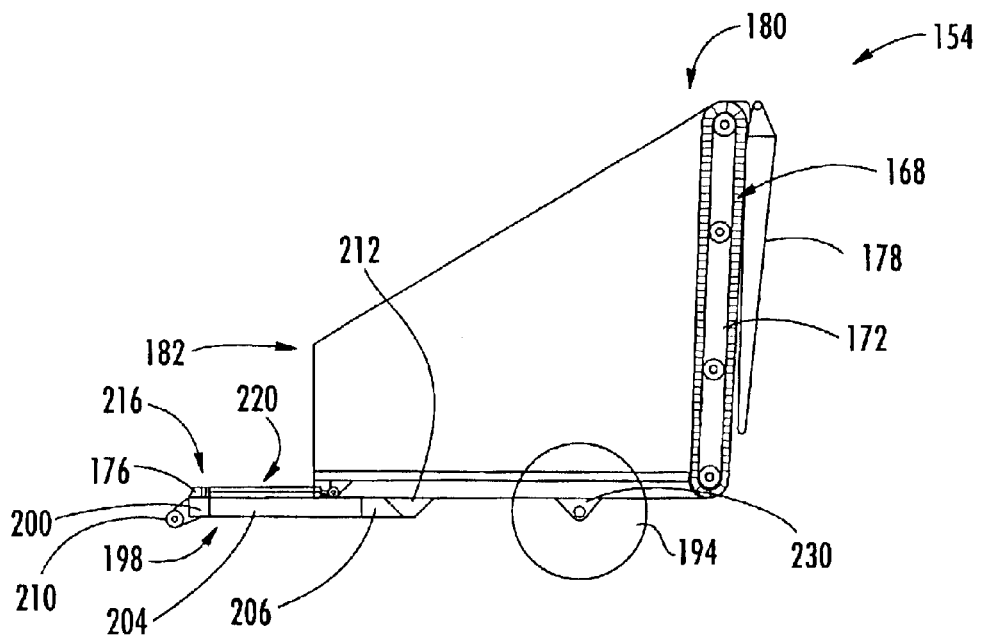
FIGS. 14–16 are side elevational views of the fruit trailer as shown in FIG. 12 during various phases of use.
Figure 15:
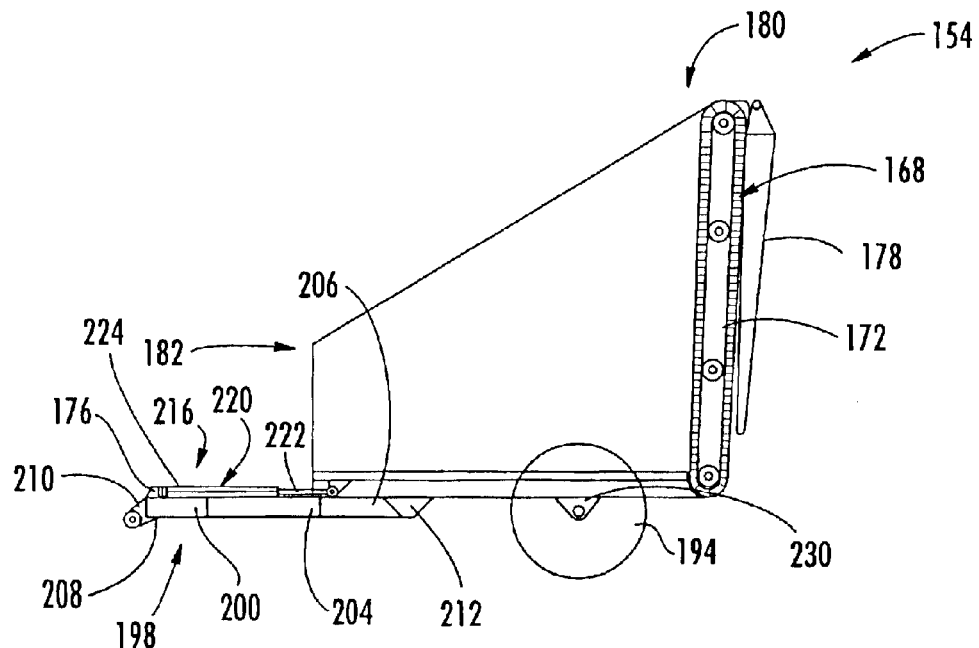
Figure 16:
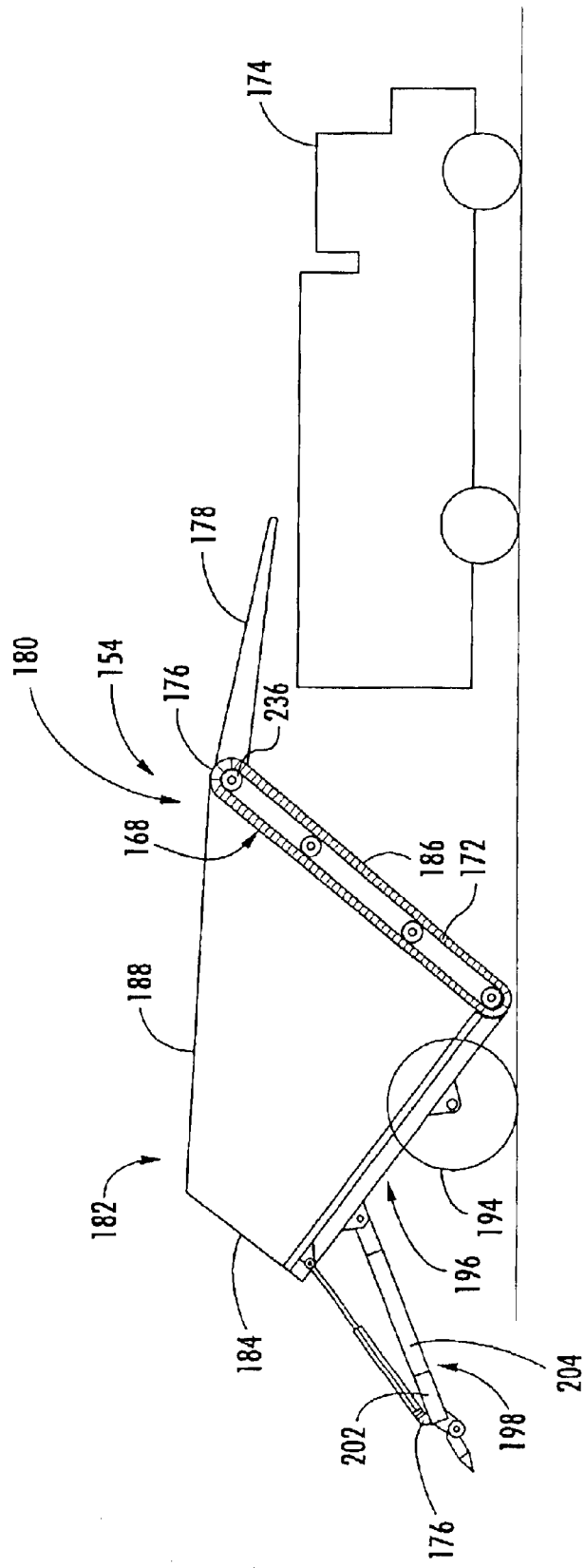

By translational action of the trailer boom 198, the open top portion of the container 182 can be positioned, for example, beneath the discharge chute 150 to readily receive fruit therefrom and then in a reverse operation be cleared from beneath the discharge chute (FIGS. 14 and 15).

For the sake of lateral rigidity, the cylinder 204, which protrudes ahead of the front wall 184, is stiffened by two arms 214, with each arm being fixedly attached on each side of the cylinder 204 and in a plane parallel to the bottom 192. While retained at a first end to the cylinder 204, each arm 214 is pivotally coupled to pivot in the vertical plane at arm ears 218 (only one of which is shown) that are solidly affixed below the frame 196 along the respective sidewalls 188, 190. The trailer boom 198, pivotally coupled by the boom pivot 212, and in alignment with both arm ears 218 relative to the bottom 192, is thus capable of pivoting relative to the plane of that floor, when the container 182 is tilted.

Figure 13:
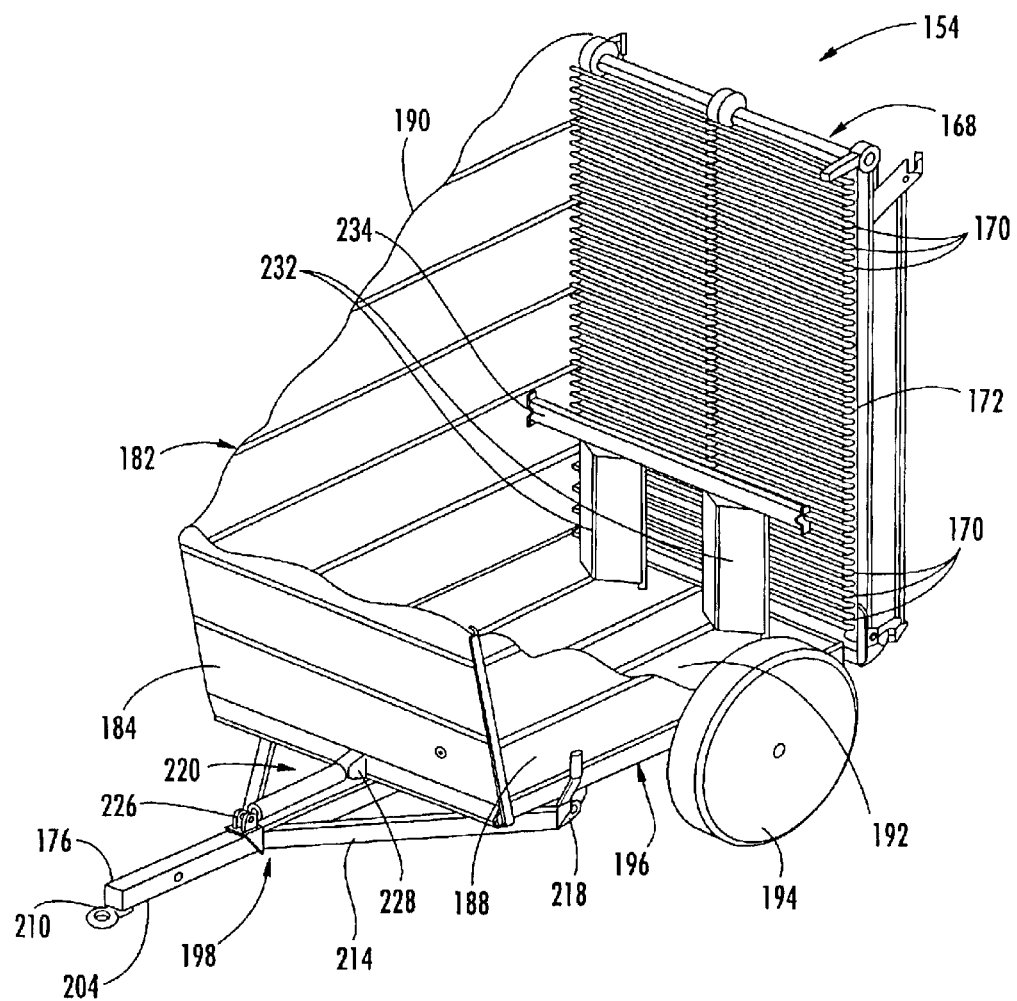
FIG. 13 is a fragmentary perspective view of the fruit trailer as shown in FIG. 11.

Another bi-directional power jack, defining an incline jack 220, is mounted in parallel with the cylinder 204, adjacent and above the cylinder. The incline jack 220 comprises a jack piston 222 and jack cylinder 224, the jack piston engaging the jack cylinder (shown in an extended position in FIG. 15) in relative longitudinally aligned translation. The incline jack 220 can be powered, for example, by an energy source (not shown) located on and controlled from the collection vehicle 42. The front end of the jack piston 222 is pivotally coupled to a pair of parallel front ears 226 fixedly retained just above the cylinder front extremity to pivot in the vertical plane. Likewise, the rear extremity of the jack cylinder 224 is pivotally coupled to jack ears 228 attached in the middle of the bottom portion of the front wall 184, for pivoting in the vertical plane (FIG. 13).

When extended, the incline jack 220 exerts a rearward moment about the wheel pivots 230 or axle, of both wheels 194, forcing the front wall 184 to lift while the back wall 186 descends. At the same time, as described above, the trailer boom 198 pivots relatively to the bottom 192 that slopes rearwards. The incline jack 220 is thus able to both tilt the fruit collection trailer 154 backwards and redress it to level condition. The angle of tilt is about 35° relative to the horizon. This means that the trailer conveyor 168 forming the back wall 186, passes from a vertical position in the collection configuration, to an inclination of 35° in the loading position, and so tilts the floor 192. Fruit collected inside the box 182, tends to level and, thus, when the fruit collection trailer 154 is tilted to the loading configuration, fruit descends along the floor 192 to the conveyor 168. The net result is that fruit is loaded by gravity onto the now inclined trailer conveyor 168.

The trailer conveyor 168, as noted above, comprises an endless conveyor belt 170 running about two rollers (not shown) that are located respectively at the bottom and at the top of the trailer conveyor. Power for motion of the conveyor belt can be provided by and controlled from the collection vehicle 42.

The conveyor belt 170 spans the inside width of the box 182 and, as also noted above, is provided with ribs 172, that are semi-rigid, flexible, and protruding in perpendicular to the surface of the conveyor belt. The conveyor belt 170 is thus able to prevent harm to the skin of the fruit by imparting an inclination for gently loading the fruit by gravity, as opposed to forced loading, such as with conveyor belts using solid ribs or buckets.

When the fruit collection trailer 154 is filled with fruit and resides in the titled loading configuration at an angle of 35°, the force exerted by the weight of the fruit on the trailer conveyor 168 equals the sine of the angle times the weight of the fruit load. As the sine of 35° equals 0.57, a weight of about 60% of the fruit weight may load the trailer conveyor 168, demanding a relatively large conveyor power. To relieve that otherwise large load on the trailer conveyor 168, a pair of baffles 232 are illustratively installed inside the container 182 in front of the trailer conveyor and rising from the bottom 192 up to a horizontal strut 234 crossing the width of the container 182. The vertical baffles 232 are illustratively V-shaped, with the bottom of the V facing the front, to allow fruit to pass from either side therefrom and thereby reach the trailer conveyor 168.

Alternatively, as will be readily appreciated by one skilled in the art, the vertical baffles may be curved or otherwise shaped so long as fruit is able to reach the trailer conveyor 168. The horizontal strut 234, which is anchored between both side walls 188, 190, is merely a strengthening element supporting the vertical baffles 232. In the tilted loading configuration, the vertical baffles 232 carry a large portion of the load of the fruit, and allow some of the fruit to pass aside those vertical baffles and to cover the surface of the conveyor belt 168 with a diminished weight of fruit.

It becomes now possible to operate the conveyor 168 with much reduced power requirements since only the fruit behind the vertical baffles 232 reaches the conveyor belt to load the trailer conveyor 168. Experience has shown, however, that for at least certain fruit, the baffles 232 may not be necessary. The explanation may reside in the shape and consistency of the fruit involved in the loading of the trailer conveyor 168. Although a large normal loading force is exerted on the conveyor 168, the fruit features perhaps a coefficient of rolling, in contrast with a coefficient of friction. It is probable that a difference of at least one order of magnitude being a multiplicand of the normal load coefficient explains why the baffles 232 may be deleted.

The elongated spout 178 is added to ensure a better distribution of the fruit being loaded in the flatbed removal truck 174. The spout 178 is pivotally connected adjacent the top of the trailer conveyor 168, for erection and folding by a mechanical, electrical, hydraulic, or other powering source readily known to those skilled in the art.

For loading fruit then, the fruit container 182 is first tilted before a flatbed truck 174 approaches and maneuvers under the spout 178, which spreads the fruit about evenly in the flatbed. However, if so desired, the spout 178 may be omitted, for the removal vehicle 174 may be loaded directly from the trailer conveyor 168 without the use of the spout. Deletion of the spout 178 saves the need for erecting the spout before the removal vehicle 174 approaches, and folding it after the removal vehicle departs and before the fruit collection trailer 154 is redressed.

It is understood that the control of the various configurations and operation of the fruit trailer 154 are well known to those skilled in the art and, therefore, need not be described in more detail here.

It will be appreciated by persons skilled in the art, that the translation and the tilting mechanisms may be implemented in various ways known to the art, which may include the use of a single power jack to both translate and tilt the fruit trailer. Additional features and advantages are described in a copending application filed concurrently herewith and assigned to the assignee of the present invention: "FRUIT HARVESTER INCLUDING PIVOTABLE FRUIT DEFLECTOR AND ASSOCIATED METHODS", Ser. No. 10/383,873, the entire disclosure of which is incorporated herein by reference. Accordingly, many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and other embodiments are intended to be included within the scope of the appended claims.

That which is claimed is:

1. A fruit harvester comprising:
   a vehicle;
   a telescoping boom carried by said vehicle and having distal and proximal ends;
   a shaker head connected to the distal end of said telescoping boom for vibrating a tree to shake fruit therefrom; and
   a boom positioning assembly comprising
      a vertical guide mounted to said vehicle,
      a hinge joint assembly movable vertically along said vertical guide and connected to the proximal end of said telescoping boom to also permit pivotal movement of said telescoping boom in both elevational and azimuthal directions,
      a vertical actuator for moving said hinge joint assembly vertically along said at least one vertical guide, and
      an elevational actuator for pivotally moving said telescoping boom in the elevational direction.

2. A fruit harvester according to claim 1 wherein said vertical guide is pivotally mounted to said vehicle; and wherein said boom positioning assembly further comprises a tilt actuator for tilting said vertical guide relative to said vehicle.

3. A fruit harvester according to claim 2 wherein said vehicle comprises a hydraulic power unit; and wherein said tilt actuator comprises at least one hydraulic cylinder selectively operated from said hydraulic power unit.

4. A fruit harvester according to claim 1 wherein said telescoping boom has a suspension position located in spaced-apart relation from the distal end thereof; and wherein said elevational actuator is connected to the boom suspension position.

5. A fruit harvester according to claim 4 wherein said elevational actuator comprises:
   an arm having a proximal end rotatably carried by said hinge joint assembly and a distal end;
   an elongate suspension member extending between the distal end of said arm and the suspension position along said telescoping boom; and
   a drive for selectively rotating said arm.

6. A fruit harvester according to claim 5 wherein said vehicle comprises a hydraulic power unit; and wherein said drive comprises at least one hydraulic cylinder selectively operated from said hydraulic power unit.

7. A fruit harvester according to claim 5 wherein said elongate suspension member cooperates with said hinge joint assembly to permit dampened azimuthal movement of said telescoping boom.

8. A fruit harvester according to claim 7 wherein said elongate suspension member comprises at least one chain.

9. A fruit harvester according to claim 1 wherein said vehicle comprises a hydraulic power unit; and wherein said vertical actuator comprises at least one hydraulic cylinder selectively operated from said hydraulic power unit.

10. A fruit harvester according to claim 1 wherein said vertical guide comprises a pair of spaced-apart vertical guide rails.

11. A fruit harvester according to claim 1 wherein said hinge joint assembly comprises:
 a mounting base for slidably engaging said vertical guide;
 a first hinge bracket connected to said mounting base;
 a second hinge bracket connected to the proximal end of said telescoping boom;
 a hinge body having first and second orthogonal passageways therethrough;
 a first hinge pin extending through the first passageway and said first hinge bracket; and
 a second hinge pin extending through the second passageway and said second hinge bracket.

12. A fruit harvester according to claim 1 wherein said telescoping boom comprises a proximal boom section and a distal boom section; and further comprising at least one boom extension/retraction actuator connected between said proximal and distal boom sections for permitting extension and retraction of said telescoping boom.

13. A fruit harvester according to claim 12 wherein said vehicle comprises a hydraulic power unit; and wherein said at least one boom extension/retraction actuator comprises at least one hydraulic cylinder selectively operated from said hydraulic power unit.

14. A fruit harvester according to claim 1 wherein said vehicle has a forward end; and wherein said boom assembly is carried by the forward end of said vehicle.

15. A fruit harvester according to claim 1 further comprising a fruit deflector carried by said telescoping boom.

16. A fruit harvester according to claim 1 wherein said vehicle comprises: a chassis; an engine carried by said chassis; and a pair of opposing tracks carried by said chassis and driven by said engine.

17. A fruit harvester according to claim 1 wherein said shaker head comprises a vibrator unit and jaws connected thereto for grasping and vibrating a tree.

18. A fruit harvester comprising:
 a vehicle;
 a telescoping boom carried by said vehicle and having distal and proximal ends;
 a shaker head connected to the distal end of said telescoping boom for vibrating a tree to shake fruit therefrom; and
 a boom positioning assembly comprising
  a vertical guide pivotally mounted to said vehicle,
  a tilt actuator for tilting said vertical guide relative to said vehicle,
  a hinge joint assembly movable vertically along said vertical guide and connected to the proximal end of said telescoping boom,
  a vertical actuator for moving said hinge joint assembly vertically along said at least one vertical guide, and
  an elevational actuator for pivotally moving said telescoping boom in the elevational direction.

19. A fruit harvester according to claim 18 wherein said telescoping boom has a suspension position located in spaced-apart relation from the distal end thereof; and wherein said elevational actuator is connected to the boom suspension position.

20. A fruit harvester according to claim 19 wherein said elevational actuator comprises:
 an arm having a proximal end rotatably carried by said hinge joint assembly and a distal end;
 an elongate suspension member extending between the distal end of said arm and the suspension position along said telescoping boom; and
 a drive for selectively rotating said arm.

21. A fruit harvester according to claim 20 wherein said vehicle comprises a hydraulic power unit; and wherein said drive comprises at least one hydraulic cylinder selectively operated from said hydraulic power unit.

22. A fruit harvester according to claim 20 wherein said hinge joint assembly permits pivotal azimuthal movement of said telescoping boom; and wherein said elongate suspension member cooperates with said hinge joint assembly to permit dampened azimuthal movement of said telescoping boom.

23. A fruit harvester according to claim 22 wherein said elongate suspension member comprises at least one chain.

24. A fruit harvester according to claim 18 wherein said vehicle comprises a hydraulic power unit; and wherein said vertical actuator comprises at least one hydraulic cylinder selectively operated from said hydraulic power unit.

25. A fruit harvester according to claim 18 wherein said vehicle comprises a hydraulic power unit; and wherein said tilt actuator comprises at least one hydraulic cylinder selectively operated from said hydraulic power unit.

26. A fruit harvester according to claim 18 wherein said vertical guide comprises a pair of spaced-apart vertical guide rails.

27. A fruit harvester according to claim 18 wherein said hinge joint assembly comprises:
 a mounting base for slidably engaging said vertical guide;
 a first hinge bracket connected to said mounting base;
 a second hinge bracket connected to the proximal end of said telescoping boom;
 a hinge body having first and second orthogonal passageways therethrough;
 a first hinge pin extending through the first passageway and said first hinge bracket; and
 a second hinge pin extending through the second passageway and said second hinge bracket.

28. A fruit harvester according to claim 18 wherein said telescoping boom comprises a proximal boom section and a distal boom section; and further comprising at least one boom extension/retraction actuator connected between said proximal and distal boom sections for permitting extension and retraction of said telescoping boom.

29. A fruit harvester according to claim 28 wherein said vehicle comprises a hydraulic power unit; and wherein said at least one boom extension/retraction actuator comprises at least one hydraulic cylinder selectively operated from said hydraulic power unit.

30. A fruit harvester according to claim 18 wherein said vehicle has a forward end; and wherein said boom assembly is carried by the forward end of said vehicle.

31. A fruit harvester according to claim 18 further comprising a fruit deflector carried by said telescoping boom.

32. A fruit harvester according to claim 18 wherein said vehicle comprises: a chassis; an engine carried by said chassis; and a pair of opposing tracks carried by said chassis and driven by said engine.

33. A fruit harvester according to claim 18 wherein said shaker head comprises a vibrator unit and jaws connected thereto for grasping and vibrating a tree.

34. A method for shaking fruit from a tree using a harvester comprising a vehicle, a telescoping boom having a distal end carried by the vehicle, and a shaker head connected to a distal end of the telescoping boom, the method comprising:

vertically positioning a hinge joint assembly along a vertical guide carried by the vehicle and connected to the proximal end of the telescoping boom to also permit pivotal movement of the telescoping boom in both elevational and azimuthal directions; and pivotally positioning the telescoping boom in the elevational direction and extending the telescoping boom to position the shaker head for shaking fruit from the tree.

35. A method according to claim 34 further comprising tilting the vertical guide relative to said vehicle.

36. A method according to claim 34 wherein the telescoping boom has a suspension position located in spaced-apart relation from the distal end thereof; and wherein pivotally moving comprises operating an elevational actuator connected to the boom suspension position.

37. A method according to claim 34 further comprising dampening azimuthal movement of the telescoping boom.

38. A method according to claim 34 wherein vertically positioning comprises operating a vertical actuator connected to the hinge joint assembly.

39. A method according to claim 34 wherein the hinge joint assembly comprises:

a mounting base for slidably engaging the vertical guide;

a first hinge bracket connected to the mounting base;

a second hinge bracket connected to the proximal end of the telescoping boom;

a hinge body having first and second orthogonal passageways therethrough;

a first hinge pin extending through the first passageway and the first hinge bracket; and a second hinge pin extending through the second passageway and the second hinge bracket.

40. A method according to claim 34 wherein extending the telescoping boom comprises extending the telescoping boom using at least one boom extension/retraction actuator.

41. A method according to claim 34 wherein the harvester further comprises a fruit deflector carried by the telescoping boom.

42. A method according to claim 34 wherein the vehicle comprises:

a chassis;

an engine carried by the chassis; and a pair of opposing tracks carried by the chassis and driven by the engine.

* * * * *